US012062473B2

(12) United States Patent
Kumaoka et al.

(10) Patent No.: US 12,062,473 B2
(45) Date of Patent: Aug. 13, 2024

(54) SOFT MAGNETIC ALLOY AND MAGNETIC COMPONENT TECHNICAL FIELD

(71) Applicant: TDK CORPORATION, Tokyo (JP)

(72) Inventors: Hironobu Kumaoka, Tokyo (JP); Kazuhiro Yoshidome, Tokyo (JP); Akito Hasegawa, Tokyo (JP); Satoko Mori, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/697,543

(22) Filed: Mar. 17, 2022

(65) Prior Publication Data

US 2022/0328223 A1 Oct. 13, 2022

(30) Foreign Application Priority Data

Mar. 31, 2021 (JP) ................................ 2021-061031

(51) Int. Cl.

*H01F 1/153* (2006.01)
*H01F 1/147* (2006.01)
*H01F 1/20* (2006.01)

(52) U.S. Cl.

CPC ......... *H01F 1/15308* (2013.01); *H01F 1/147* (2013.01); *H01F 1/20* (2013.01)

(58) Field of Classification Search

CPC ........ H01F 1/15308; H01F 1/20; H01F 1/147; H01F 27/14

See application file for complete search history.

(56) References Cited

U.S. PATENT DOCUMENTS

| | | | | |
|---|---|---|---|---|
| 2007/0175545 | A1* | 8/2007 | Urata | H01F 41/0226 148/304 |
| 2017/0294254 | A1 | 10/2017 | Urata et al. | |
| 2017/0323712 | A1* | 11/2017 | Yoshizawa | C21D 9/52 |

FOREIGN PATENT DOCUMENTS

| | | | |
|---|---|---|---|
| JP | 2007-231415 | A | 9/2007 |
| JP | 2009-293099 | A | 12/2009 |
| JP | 2014-167139 | A | 9/2014 |

* cited by examiner

*Primary Examiner* — Adil A. Siddiqui
(74) *Attorney, Agent, or Firm* — Oliff PLC

(57) ABSTRACT

A soft magnetic alloy including an internal area having a soft magnetic type alloy composition including Fe and Co, a Co concentrated area existing closer to a surface side than the internal area and having a higher Co concentration than in the internal area, and a Co concentration degree of the Co concentrated area is larger than 1.2.

6 Claims, 11 Drawing Sheets

SOFT MAGNETIC ALLOY AND MAGNETIC COMPONENT TECHNICAL FIELD

TECHNICAL FIELD

The present disclosure relates to a soft magnetic alloy, and a magnetic component using the soft magnetic alloy.

BACKGROUND

As a magnetic material used for various magnetic components such as an inductor and the like, soft magnetic alloys shown in Patent Documents 1 to 3 are known. These soft magnetic alloys have a higher saturation magnetic flux density Bs than a ferrite material, and exhibits good soft magnetic properties. Note that, occasionally, corrosion such as rust and the like may be formed to a soft magnetic alloy, thus an improved corrosion resistant of the soft magnetic alloy was demanded.

[Patent Document 1] Patent Application Laid Open No. 2009-293099

[Patent Document 2] Patent Application Laid Open No. 2007-231415

[Patent Document 3] Patent Application Laid Open No. 2014-167139

SUMMARY

The present disclosure is achieved in view of such circumstances, and the object is to provide a soft magnetic alloy having a high corrosion resistance, and a magnetic component using the soft magnetic alloy.

In order to attain the above-mentioned object, the soft magnetic alloy according to the present disclosure includes an internal area having a soft magnetic type alloy composition including Fe and Co, and a Co concentrated area existing closer to a surface side than the internal area and having a higher Co concentration than in the internal area, wherein a Co concentration degree of the Co concentrated area is larger than 1.2.

As a result of keen study by the present inventors, the soft magnetic alloy satisfying the above-described characteristics can suppress rust formation when it is immersed in water, thus a corrosion resistance is improved.

Preferably, the Co concentrated area may include a metal phase.

Preferably, an amorphous degree of the soft magnetic alloy may be 85% or more.

Preferably, the soft magnetic alloy may be a ribbon form, or it may be a powder form.

The use of the soft magnetic alloy of the present disclosure is not particularly limited, and for example, it can be used for various coil components such as an inductor and the like, a filter, and various magnetic components such as an antenna, and the like. Among the above-mentioned uses, the soft magnetic alloy of the present disclosure is suitable as a material for a magnetic core in the coil component and the like.

DETAILED DESCRIPTION

Hereinafter, the present disclosure is described in further detail based on embodiments shown in the figures.

A soft magnetic alloy 1 of the present embodiment can be a ribbon form, a powder form, a block form, and the like; and a shape of the soft magnetic alloy 1 is not particularly limited. Also, a size of the soft magnetic alloy 1 is not particularly limited. For example, when the soft magnetic alloy 1 is a ribbon form, a thickness of the ribbon may be within a range of 15 μm to 100 μm. When the soft magnetic alloy 1 is a powder form, an average particle size of the soft magnetic alloy powder can be within a range of 0.5 μm to 150 μm, and preferably within a range of 0.5 μm to 25 μm.

Note that, the above-mentioned average particle size can be measured by using various particle size analyzing method such as a laser diffraction method and the like; and preferably, the average particle size may be measured by using a particle image analyzer Morphologi G3 (made by Malvern Panalytical Ltd). A Morphologi G3 is a device which disperses the soft magnetic alloy powder using air, and a projected area of the individual particle constituting the powder is measured, then a particle size distribution of a circle equivalent diameter from the projected area is obtained. Then, from the obtained particle size distribution, the average particle size is a particle size where a volume-based or number-based cumulative relative frequency is 50%. Note that, when the soft magnetic alloy 1 is included in the magnetic core, the average particle size of the soft magnetic alloy 1 (powder) is obtained by measuring the circle equivalent diameter of the particle included in the cross section by observing the cross section using an electron microscope (SEM, STEM, and the like).

Figure 1A:
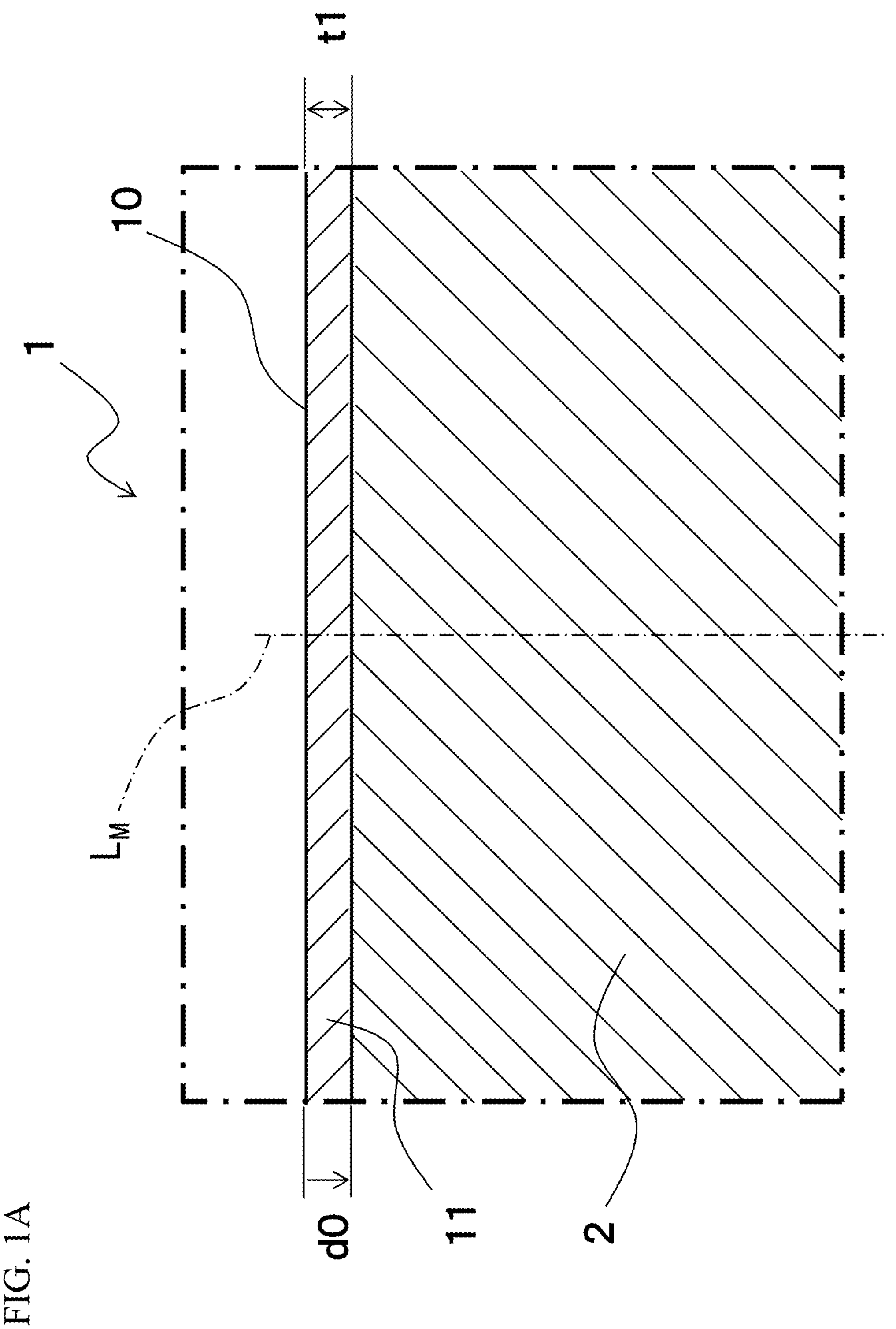
FIG. 1A is an enlarged cross section of an essential part of a soft magnetic alloy 1 according to an embodiment of the present disclosure.

FIG. 1A is a cross section which is an enlarged image near a surface of the soft magnetic alloy 1. As shown in FIG. 1A, the soft magnetic alloy 1 includes an internal area 2, a Co concentrated area 11 is positioned closer to the surface side of the soft magnetic alloy 1 than the internal area 2. Note that, in the present embodiment, "an inner side" means a side closer to a center of the soft magnetic alloy 1, "a surface side" or "an outer side" means a side away from the center of the soft magnetic alloy 1.

(Internal Area 2)

The internal area 2 is a main part of the soft magnetic alloy 1 which occupies at least 90 vol % of a volume of the soft magnetic alloy 1. Thus, an average composition of the soft magnetic alloy 1 can be considered as a composition of the internal area 2, and a crystal structure of the soft magnetic alloy 1 can be considered as a crystal structure of the internal area 2. Note that, a volume ratio of the above-mentioned internal area 2 is interchangeable with an area ratio, and the internal area 2 occupies at least 90% of a cross section of the soft magnetic alloy 1.

The internal area 2 (that is, the soft magnetic alloy 1) has a soft magnetic type alloy composition including Fe and Co, and a specific alloy composition is not particularly limited. For example, the internal area 2 can be a crystal type soft magnetic alloy such as a Fe—Co based alloy, a Fe—Co—V based alloy, a Fe—Co—Si based alloy, a Fe—Co—Si—Al based alloy, and the like. Further, in the internal area 2, P is preferably included, and as a crystal type soft magnetic alloy including P, a Fe—Co—Si—P based alloy, a Fe—Co—Si—P—Cr based alloy, and the like may be mentioned. By including P in the internal area 2, Co tends to easily concentrate at an outer edge of the internal area 2.

Also, from the point of lowering a coercivity, the internal area 2 is preferably constituted by an amorphous alloy composition or a nanocrystal alloy composition. As an amorphous or nanocrystal soft magnetic alloy, a Fe—Co—P—C based alloy, a Fe—Co—B based alloy, a Fe—Co—B—Si based alloy, or the like may be mentioned. More specifically, the internal area 2 is preferably constituted by an alloy composition satisfying a compositional formula of $((Fe_{(1-(\alpha+\beta))}Co_{\alpha}Ni_{\beta})_{1-\gamma}X1_{\gamma})_{(1-(a+b+c+d+e))}B_aP_bSi_cC_dCr_e$. As the internal area 2 is constituted by the alloy composition satisfying the above-compositional formula, a crystal structure made of amorphous, heteroamorphous, or nanocrystals tends to be obtained easily.

In the above-mentioned compositional formula, "B" is boron, "P" is phosphorous, "C" is carbon, and X1 is at least one selected from Ti, Zr, Hf, Nb, Ta, Mo, W, Al, Ga, Ag, Zn, S, Ca, Mg, V, Sn, As, Sb, Bi, N, O, Au, Cu, rare earth elements, and platinum group elements. The rare earth elements include Sc, Y, and lanthanoids; and the platinum group elements include Ru, Rh, Pd, Os, Ir, and Pt. Also, $\alpha$, $\beta$, $\gamma$, a, b, c, d, and e represent atomic ratios, and these atomic ratios preferably satisfy the following relations.

A Co amount ($\alpha$) with respect to Fe may be within a range of $0.005\leq\alpha\leq0.700$, may be within a range of $0.010\leq\alpha\leq0.600$, may be within a range of $0.030\leq\alpha\leq0.600$, or may be within a range of $0.050\leq\alpha\leq0.600$. When the Co amount ($\alpha$) is within the above-mentioned range, a saturation magnetic flux density (Bs) and the corrosion resistance improve. From the point of improving Bs, the Co amount ($\alpha$) may preferably be within a range of $0.050\leq\alpha\leq0.500$. As the Co amount (a) increases, the corrosion resistance tends to improve; and when the Co amount (a) is too large, Bs tends to decrease easily.

Also, a Ni amount ($\beta$) with respect to Fe may be within a range of $0\leq\beta\leq0.200$. That is, Ni may not be included, and the Ni amount ($\beta$) may be within a range of $0.005\leq\beta\leq0.200$. From the point of improving Bs, the Ni amount ($\beta$) may be within a range of $0\leq\beta\leq0.050$, may be within a of $0.001\leq\beta\leq0.050$, or may be within a range of $0.005\leq\beta\leq0.010$. As the Ni amount ($\beta$) increases, the corrosion resistance tends to improve, and when the Ni amount ($\beta$) is too large, Bs decreases.

X1 may be included as impurities, or may be added intentionally. A X1 amount ($\gamma$) may be within a range of $0\leq\gamma\leq0.030$. That is, less than 3.0% of a total amount of Fe, Co, and Ni may be substituted by X1.

Further, when a sum of atomic ratios of elements constituting the soft magnetic alloy is 1, an atomic ratio of a total amount of Fe, Co, Ni, and X1 is preferably within a range of $0.720\leq(1-(a+b+c+d+e))\leq0.950$, and more preferably is within a range of $0.780\leq(1-(a+b+c+d+e))\leq0.890$. When the above-mentioned relation is satisfied, Bs tends to improve easily. Also, when $0.720\leq(1-(a+b+c+d+e))\leq0.890$ is satisfied, an amorphous soft magnetic alloy is easily obtained.

The atomic ratio of B is represented by "a", and "a" is preferably within a range of $0\leq a\leq0.200$; and from the point of improving Bs, "a" is more preferably within a range of $0\leq a\leq0.150$.

The atomic ratio of P is represented by "b", and "b" is preferably within a range of $0\leq b\leq0.100$. That is, P may not be included, and from the point of improving both Bs and the corrosion resistance, "b" is preferably within a range of $0.001\leq b\leq0.100$, more preferably within a range of $0.005\leq b\leq0.080$, and particularly preferably within a range of $0.005\leq b\leq0.050$.

The atomic ratio of Si is represented by "c", and "c" is preferably within a range of $0\leq c\leq0.150$. That is, Si may not be included; and from the point of improving both Bs and the corrosion resistance, "c" is more preferably within a range of $0.001\leq c\leq0.070$.

The atomic ratio of C is represented by "d", and "d" is preferably within a range of $0\leq d\leq0.050$. That is, C may not be included; and from the point of improving both Bs and the corrosion resistance, "d" is more preferably within a range of $0\leq d\leq0.020$.

The atomic ratio of Cr is represented by "e", and "e" is preferably within a range of $0\leq e\leq0.050$. That is, from the point of improving Bs, Cr may not be included; and from the point of improving both Bs and the corrosion resistance, "e" is more preferably within a range of $0.001\leq e\leq0.020$.

The composition of the above-mentioned internal area 2 (that is, the composition of the soft magnetic alloy 1) can be analyzed, for example, using Inductively Coupled Plasma (ICP). Here, when it is difficult to determine an oxygen amount using ICP, an impulse heat melting extraction method can be used. Also, if it is difficult to determine a carbon amount and a sulfur amount using ICP, an infrared absorption method can be used.

Also, other than ICP, a compositional analysis may be carried out by EDX (Energy Dispersive X-ray Spectroscopy) or EPMA (Energy Probe Microanalyzer) using an electron microscope. For example, regarding the soft magnetic alloy 1 included in a magnetic core which includes a resin component, a compositional analysis using ICP may be difficult in some cases. In such case, the compositional analysis may be carried out using EDX or EPMA. Also, if a detailed compositional analysis is difficult by any of the above-mentioned methods, the detailed compositional analysis may be performed using 3DAP (three dimensional atom probe). In case of using 3DAP, the influence of the resin component, a surface oxidation, and the like are excluded from the area of analysis, and the composition of the soft magnetic alloy 1, that is the composition of the internal area 2, can be determined. This is because when 3DAP is used, a small area (for example, an area of $\varphi$20 nm×100 nm) is set in the soft magnetic alloy 1 to determine an average composition.

Figure 3A:
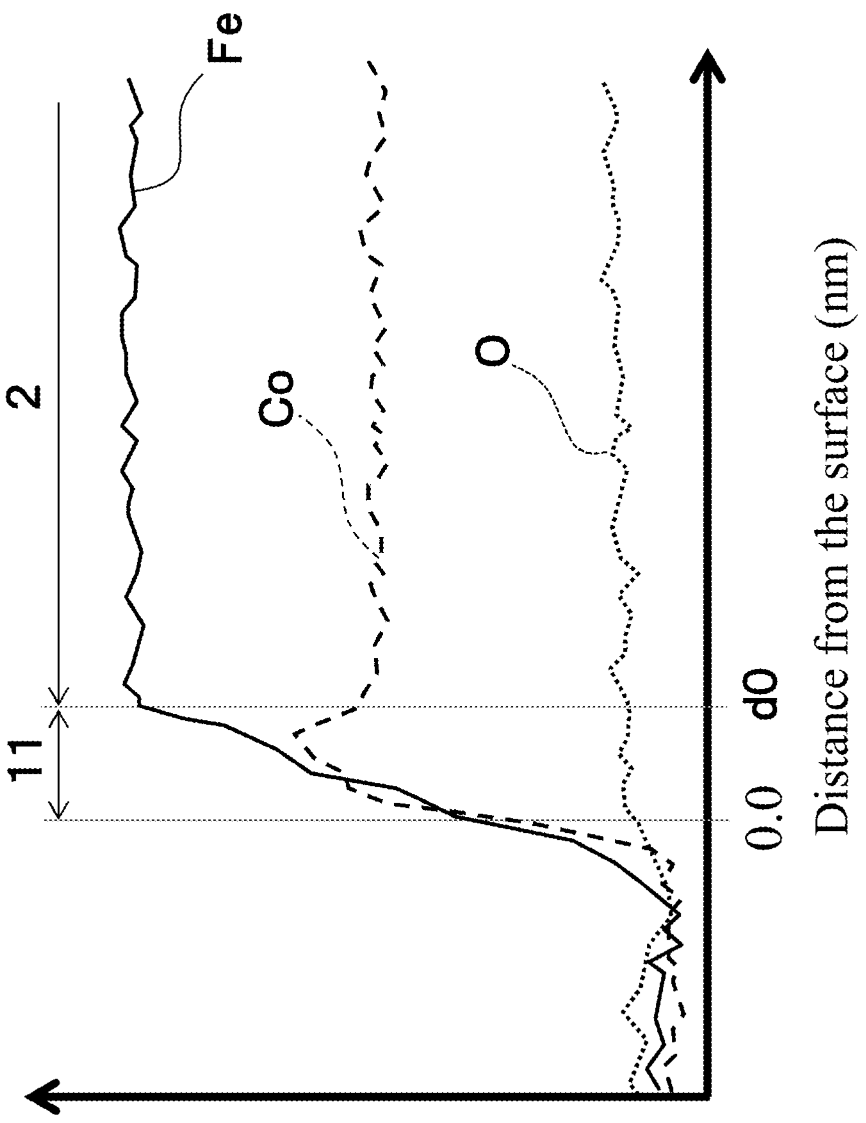
FIG. 3A is an example of a graph obtained by performing a line analysis using EDX along a measurement line $L_M$ shown in FIG. 1A.

Note that, in case a line analysis of a cross section near the surface side of the soft magnetic alloy 1 is carried out using EDX or EELS (Electron Energy Loss Spectroscopy), the internal area 2 can be recognized as an area having stable concentrations of Fe and Co (see FIG. 3A). Also, for example, the average composition obtained by performing a mapping analysis to the internal area 2 can be considered as the composition of the soft magnetic alloy 1. In such case, the mapping analysis is performed using EDX or EELS; and an area to be measured is an area which is 100 nm or more away in a depth direction from the surface of the soft magnetic alloy 1 (corresponds to the internal area 2), and an area of measurement may be about 256 nm×256 nm or so.

A crystal structure of the internal area 2 (that is, a crystal structure of the soft magnetic alloy 1) can be a crystalline structure, a nanocrystal structure, or an amorphous structure; and preferably the crystal structure of the internal area 2 may be an amorphous structure. In other words, an amorphous degree X of the internal area 2 (that is, an amorphous degree X of the soft magnetic alloy 1) may preferably be 85% or more. The crystal structure having the amorphous degree X of 85% or more is a structure which is mostly made of amorphous, or heteroamorphous. The structure made of heteroamorphous is a structure in which crystals slightly exist inside amorphous. That is, in the present embodiment, “a crystal structure is amorphous” means that a crystal structure has the amorphous degree X of 85% or more; and crystals may be included as long as the amorphous degree X satisfies the above-mentioned range.

Note that, in case the structure is heteroamorphous, the average crystal particle size of the crystals existing in amorphous structure may preferably be within a range of 0.1 nm or more and 10 nm or less. Also, in the present embodiment, “nanocrystal” refers to a structure in which the amorphous degree X is less than 85% and the average crystal particle size is 100 nm or less (preferably, 3 nm to 50 nm). Further, “crystalline” refers to a crystal structure in which the amorphous degree X is less than 85% and the average crystal particle size is larger than 100 nm.

Figure 2A:
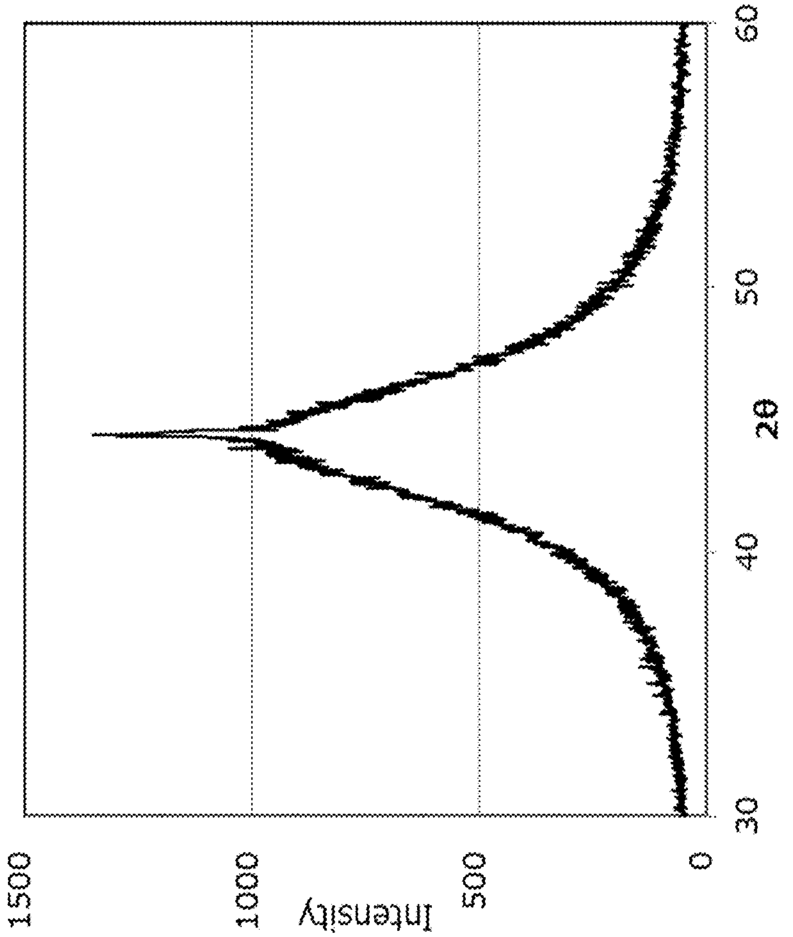
FIG. 2A is an example of a chart obtained from an X-ray crystallography.

The amorphous degree X can be measured by X-ray crystallography using XRD. Specifically, 2θ/θ measurement is performed using XRD to the soft magnetic alloy 1 according to the present embodiment, and a chart shown in FIG. 2A is obtained. Here, a measurement range of a diffraction angle 2θ may preferably be set to a range in which amorphous-derived halos can be confirmed, for example within a range of 2θ=30° to 600.

Figure 2B:
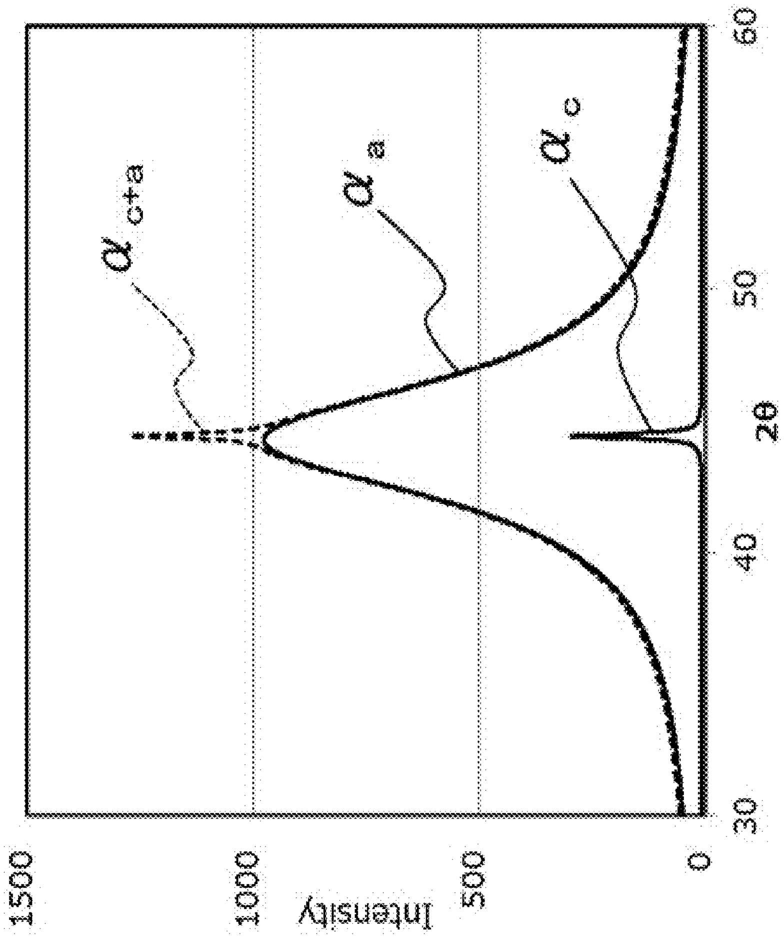
FIG. 2B is an example of a pattern obtained by profile fitting the chart shown in FIG. 2A.

Next, the chart shown in FIG. 2A is profile-fitted using a Lorentz function represented by the following equation (2). In this profile fitting, a difference between the integrated intensities actually measured using XRD and the integrated intensities calculated using the Lorentz function is preferably within 1%. As a result of this profile fitting, as shown in FIG. 2B, a crystal component pattern $\alpha_c$ which indicates a crystal scattering integrated intensity Ic, an amorphous component pattern $\alpha_a$ which indicates an amorphous scattering integrated intensity Ia, and a pattern $\alpha_{c+a}$ which is a combination of these two are obtained. Then, the crystal scattering integrated intensity Ic and the amorphous scattering integrated intensity Ia obtained as such are placed in the below equation (1), thereby the amorphous degree X is obtained.

$$X=100-(Ic/(Ic+Ia)\times 100) \qquad \text{Equation (1)}$$

Ic: Crystal scattering integrated intensity

Ia: Amorphous scattering integrated intensity

[Formula 1]

$$f(x)=\frac{h}{1+\frac{(x-u)^2}{w^2}}+b \qquad \text{(Equation 2)}$$

h: Peak height u: Peak position w: Half bandwidth b: Background height

Note that, a method of measuring the amorphous degree X is not limited to a method using the above-mentioned XRD, and the amorphous degree X may be measured by using EBSD (Electron BackScatter Diffraction) or electron diffraction.

(Co Concentrated Area 11)

The Co concentrated area 11 is an area having a higher concentration of Co than in the internal area 2. In the present embodiment, this Co concentrated area 11 may preferably be an amorphous metal phase continuous from the internal area 2, and covers at least part of a periphery of the internal area 2. A coverage of the Co concentrated area 11 with respect to the internal area 2 in the cross section of the soft magnetic alloy 1 is not particularly limited, and the coverage can be 50% or more, or more preferably it is 80% or more.

Figure 5A:
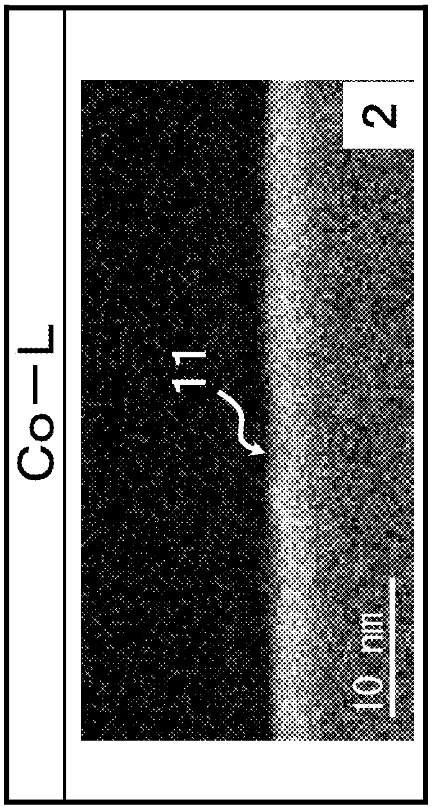
FIG. 5A is an example of an EELS image of the soft magnetic alloy 1 shown in FIG. 1A.

The cross section of the surface area of the soft magnetic alloy 1 is observed using STEM (scanning transmission electron microscope) or TEM (transmission electron microscope), and at the same time a mapping analysis is performed using EDX or EELS, thereby the presence of the Co concentrated area 11 and the coverage thereof can be verified. For example, an image (EELS image) shown in FIG. 5A is an example of the mapping analysis result by EELS. The EELS image of FIG. 5A shows the Co distribution, and a shade of Co is expressed by a contrast of bright or dark. In FIG. 5A, the internal area 2 can be recognized as an area where almost no shade of Co can be seen in Co concentration distribution. Further, at the edge of the internal area 2, the contrast becomes brighter, and this implicates that the Co concentration is higher than in the internal area 2. This area with a high Co concentration is the Co concentrated area 11, and the presence of the Co concentrated area 11 can be confirmed by the EELS image of Co.

An average thickness t1 of the Co concentrated area 11 identified by this mapping analysis is preferably 0.3 nm or more. The upper limit of t1 is not particularly limited, and for example it can be 30.0 nm or less. When t1 is thickened within this preferable range, further enhanced corrosion resistance can be obtained. Note that, the average thickness t1 is preferably calculated by measuring the thickness of the Co concentrated area 11 at least from 3 different points by changing the area of measurement.

As mentioned in above, the Co concentrated area 11 may be extremely thin in some cases, thus in case of identifying the Co concentrated area 11, a line analysis is preferably used together with the mapping analysis. FIG. 3A is a schematic diagram showing an example of a line analysis result along a measurement line $L_M$ shown in FIG. 1A; and a vertical axis is a detection intensity of each element (that is, the intensity of characteristic X-ray), and a horizontal axis is a distance (depth) from the outer most surface 10. As shown in FIG. 3A, the line analysis results show a high peak of Co concentration at the edge of the internal area 2 in which the concentrations of Fe and Co are stable. The area showing this peak of Co is the Co concentrated area 11. In other words, a local maximum of the Co concentration exists in the Co concentrated area 11, and due to the above-mentioned peak, the presence of the Co concentrated area 11 can be confirmed.

Also, as mentioned in above, the Co concentrated area 11 having the above-mentioned peak preferably is a metal phase. A phase state of the Co concentrated area 11 can be verified by the above-mentioned line analysis, the mapping analysis, or analysis using EELS (Electron Energy Loss Spectroscopy) of STEM or TEM. For example, by analyzing spectrums obtained by EELS are analyzed, ratios of oxides of Co and metal Co in the Co concentrated area 11 can be calculated. When a ratio of metal Co is larger than a ratio of oxides of Co, the Co concentrated area 11 is defined as a metal phase. When oxide layers (a SB oxide layer 12, a Fe oxide layer 13, a coating layer 20, and the like which are described in below) exist outside of Co concentrated area 11, then the detection intensity of oxygen at the Co concentrated area 11 is lower than that of the oxide layers. Due to such analysis, it is understood that the Co concentrated area 11 is a metal phase.

Also, in the present embodiment, the Co concentration degree in the Co concentrated area 11 is defined by a ratio ($C11_{Co}/C2_{Co}$) which is a Co mole ratio in the Co concentrated area 11 ($C11_{Co}$) with respect to a Co mole ratio in the internal area 2 ($C2_{Co}$). The Co concentration degree may be larger than 1.20, and preferably 1.50 or more. Note that, the upper limit of the Co concentration degree is not particularly limited, and for example it can be 20 or less.

When a soft magnetic alloy which is made of the internal area 2 without forming the Co concentrated area 11 is used as a standard alloy, the corrosion resistance of the soft magnetic alloy 1 of the present embodiment compared to the standard alloy tends to improve as the Co concentration degree increases. That is, the Co concentration degree and the corrosion resistance show a positive correlation. Note that, as the internal area 2 of the soft magnetic alloy 1 includes a predetermined amount of P, the Co concentration degree tends to increase easily, and the corrosion resistance tends to further improve.

$C2_{Co}$ and $C11_{Co}$ used for the calculation of the Co concentration degree are measured by carrying out a component analysis using EELS. Specifically, $C2_{Co}$ is a mole ratio of Co with respect to a total of Fe and Co detected in the internal area 2, and $C2_{Co}$ is calculated by analyzing the EELS spectrums. Similarly, $C11_{Co}$ is a mole ratio of Co with respect to a total of Fe and Co detected in the Co concentrated area 11. That is, the mole ratio of Co in each area is represented by "Co/(Fe+Co)". In order to remove the influence from the impurities (elements which are mixed while making the measurement sample), (Fe+Co) is used as a denominator. Note that, a resolution during said analysis is preferably set to 0.5 nm or less, and for measuring $C2_{Co}$, preferably a point which is a depth of 0.2 μm or deeper from the outermost surface 10 of the soft magnetic alloy 1 towards the inside is measured. Also, the above-mentioned measurement is performed to at least five observation fields, and the Co concentration degree is obtained as the average of the measurement results.

Note that, in the Co concentrated area 11, Co is detected as a main constitution element, and other than this, elements which constitute the internal area 2 such as Fe and the like are also included in the Co concentrated area 11. Further, in the Co concentrated area 11, as similar to the concentration of Co, other elements may be concentrated as well; and as one of such other elements, P may be mentioned. In this case, in a mapping analysis and a line analysis, a highly concentrated area of P may be observed in a way which overlaps with a highly concentrated area of Co in a depth direction.

As discussed in above, the soft magnetic alloy 1 has a characteristic surface structure which includes the Co concentrated area 11. Particularly, in the present embodiment, as shown in FIG. 1A and FIG. 3A, the Co concentrated area 11 is positioned at the outermost surface side, and constitutes the outermost surface 10 of the soft magnetic alloy 1. Note that, at the outer side of the Co concentrated area 11, other surface structures may be formed.

Figure 1B:
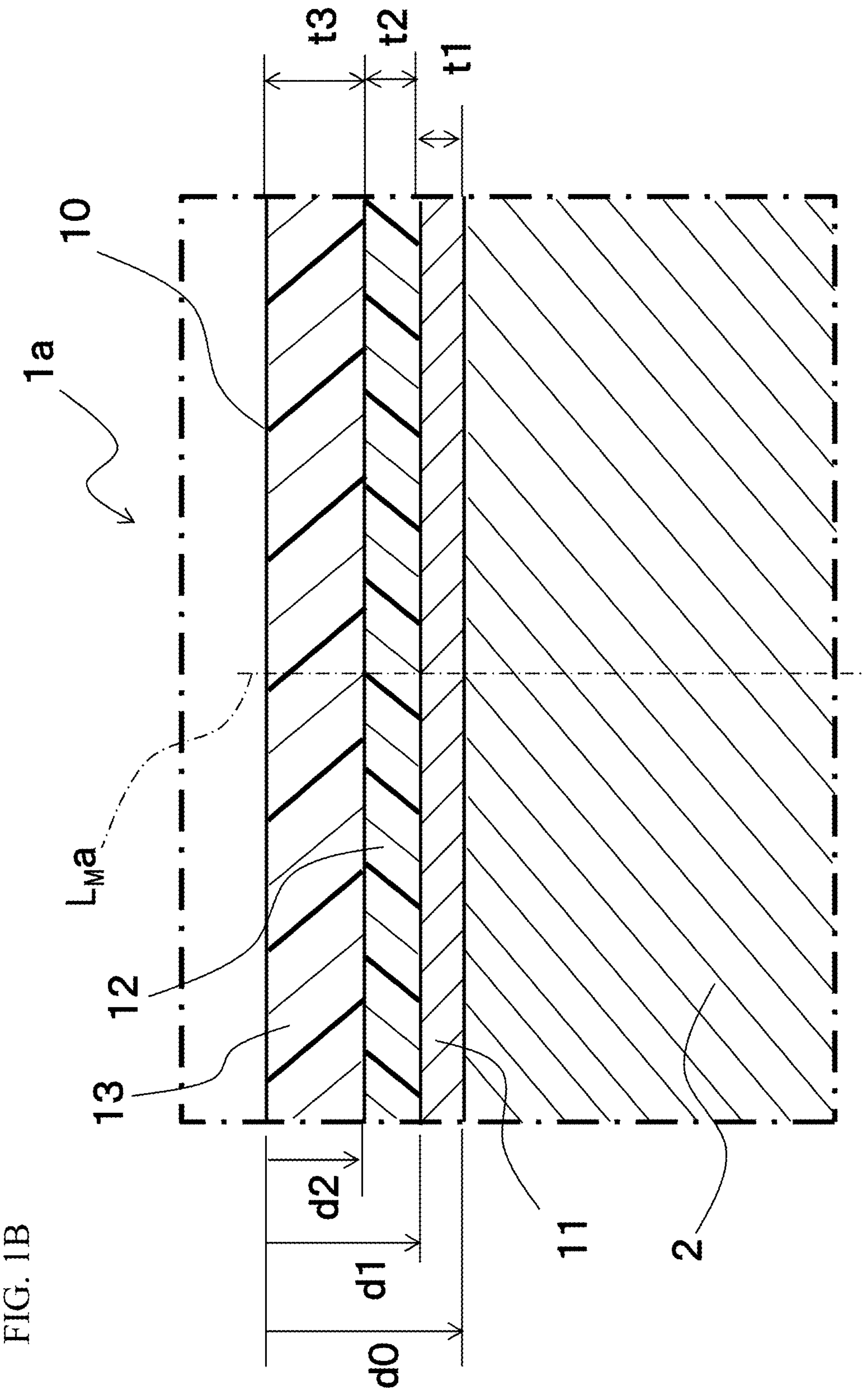
FIG. 1B is an example of an enlarged cross section of a soft magnetic alloy 1*a* according to an embodiment of the present disclosure.

For example, as the soft magnetic alloy 1*a* of FIG. 1B shows, a SB oxide layer 12 including Si or/and B may be formed so that it covers the surface side of the Co concentrated area 11. This SB oxide layer 12 is an area having a higher concentration of at least one selected from Si and B than in the internal area 2, and either one of Si and B, or both Si and B are concentrated.

Figure 5B:
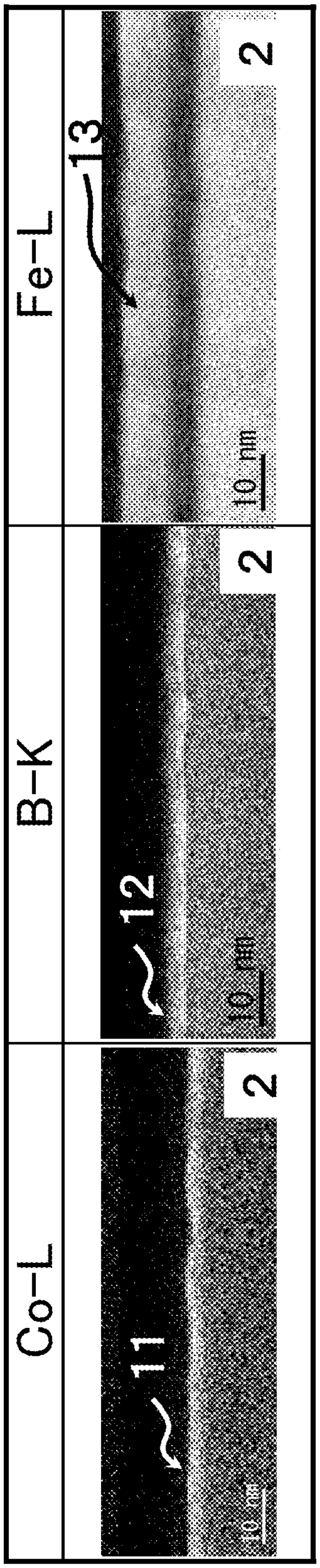
FIG. 5B is an example of an EELS image of the soft magnetic alloy 1*a* shown in FIG. 1B.

FIG. 5B is in fact an example of an EELS image of the soft magnetic alloy 1*a* shown in FIG. 1B. The three EELS images shown in FIG. 5B are results measured from the same place. The EELS image of FIG. 5B regarding B (center: B-K) shows brighter contrast at the position closer to the surface side than the Co concentrated area 11 where Co is concentrated, and this indicates that the concentration of B at said area is higher than in the internal area 2 and the Co concentrated area 11. In FIG. 5B, the area having a higher B concentration is the SB oxide layer 12.

When Si or/and B is included in the internal area 2, in some cases the SB oxide layer 12 is formed while the Co concentrated area 11 is formed, and the SB oxide layer 12 is preferably an amorphous oxide phase. An average thickness t2 of the SB oxide layer 12 is preferably 0.5 nm or more. The upper limit of t2 is not particularly limited, and for example it can be 30 nm or less.

Also, the Fe oxide layer 13 including Fe may be formed at the outside of the Co concentrated area 11. In some cases, this Fe oxide layer 13 is formed together while the Co concentrated area 11 is formed, and the Fe oxide layer 13 has a higher Fe concentration than in the Co concentrated area 11 and the internal area 2. Note that, as shown in FIG. 1B, when the SB oxide layer 12 exists, the Fe oxide layer 13 is preferably positioned closer to the surface side than the SB oxide layer 12, and further the Fe oxide layer 13 has a higher crystallized area than the SB oxide layer 12.

In the EELS image regarding Fe (right side: Fe-L) shown in FIG. 5B, the contrast is brighter at the surface side than in the SB oxide layer 12, which indicates that the high Fe concentration area exists at the outermost surface of the soft magnetic alloy 1*a*. Said area is the Fe oxide layer 13, and the Fe oxide layer 13 constitutes the outermost surface 10 of the soft magnetic alloy 1*a*. In the present embodiment, an average thickness t3 of the Fe oxide layer 13 is preferably 1 nm or more. The upper limit of t3 is not particularly limited, and for example it can be 50 nm or less.

Figure 3B:
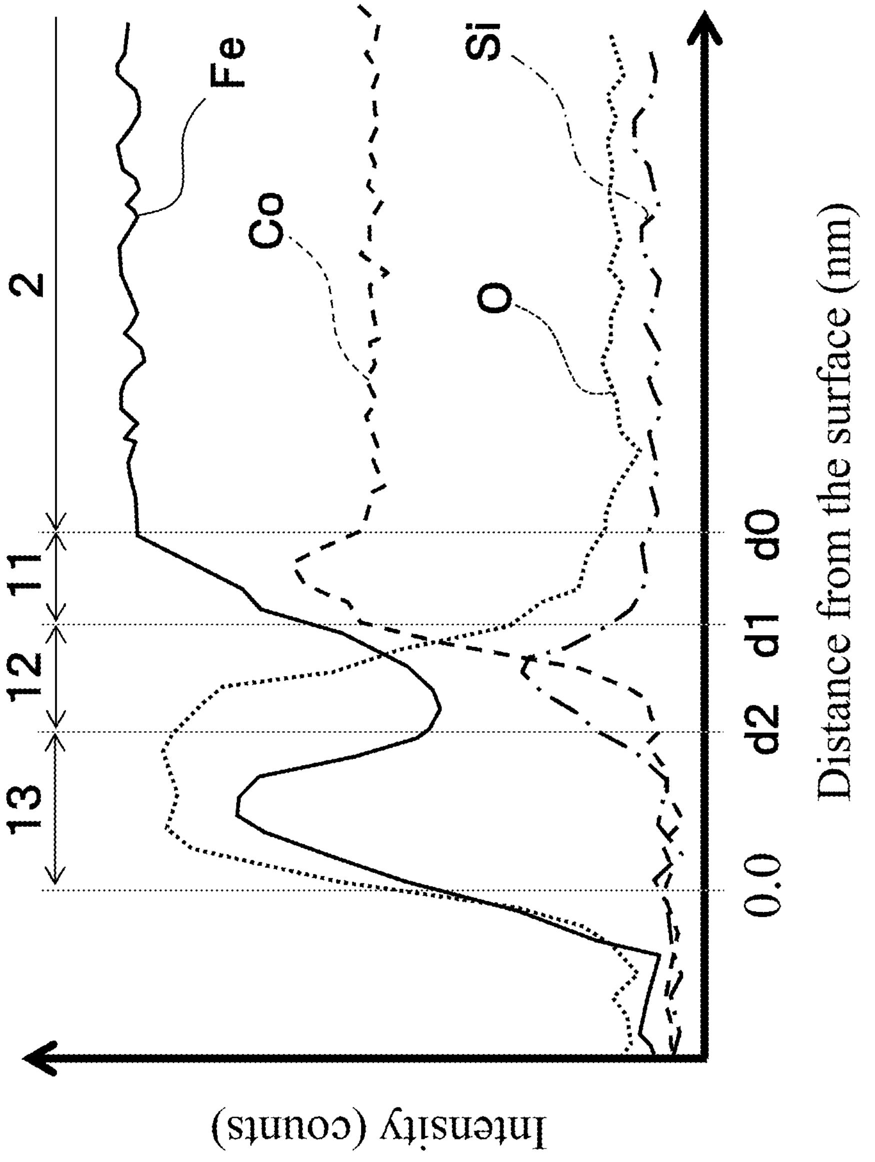
FIG. 3B is an example of a graph obtained by performing a line analysis using EDX along a measurement line $L_Ma$ shown in FIG. 1B.

FIG. 3B is a schematic graph showing the results of line analysis using EDX along the measurement line $L_M a$ shown in FIG. 1B. When the SB oxide layer 12 exists, as shown in FIG. 3B, peaks of Si or/and B is observed at further surface side than a peak of Co, and also the detection intensity of oxygen becomes stronger which overlaps with the peaks of Si or/and B. Also, when the Fe oxide layer 13 also exists at surface side of the SB oxide layer 12*a*, a peak of Fe can be confirmed at the position closer to the surface side than the peaks of Si or/and B. As such, the presence of the SB oxide layer 12 and the Fe oxide layer 13 can be verified by a line analysis using EDX or EELS, and also a mapping analysis shown in FIG. 5B can be used for verification.

Figure 4A:
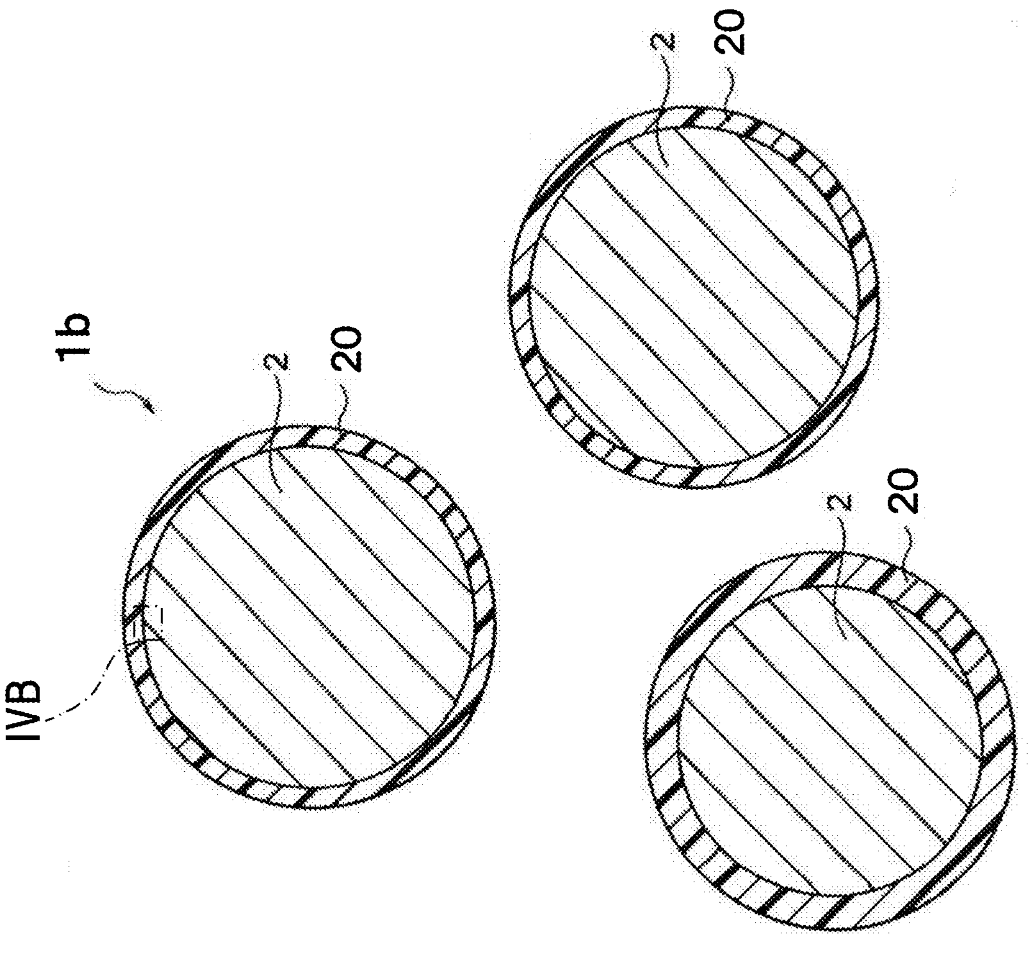
FIG. 4A is a cross section showing a soft magnetic alloy 1*b* according to an embodiment of the present disclosure.
Figure 4B:
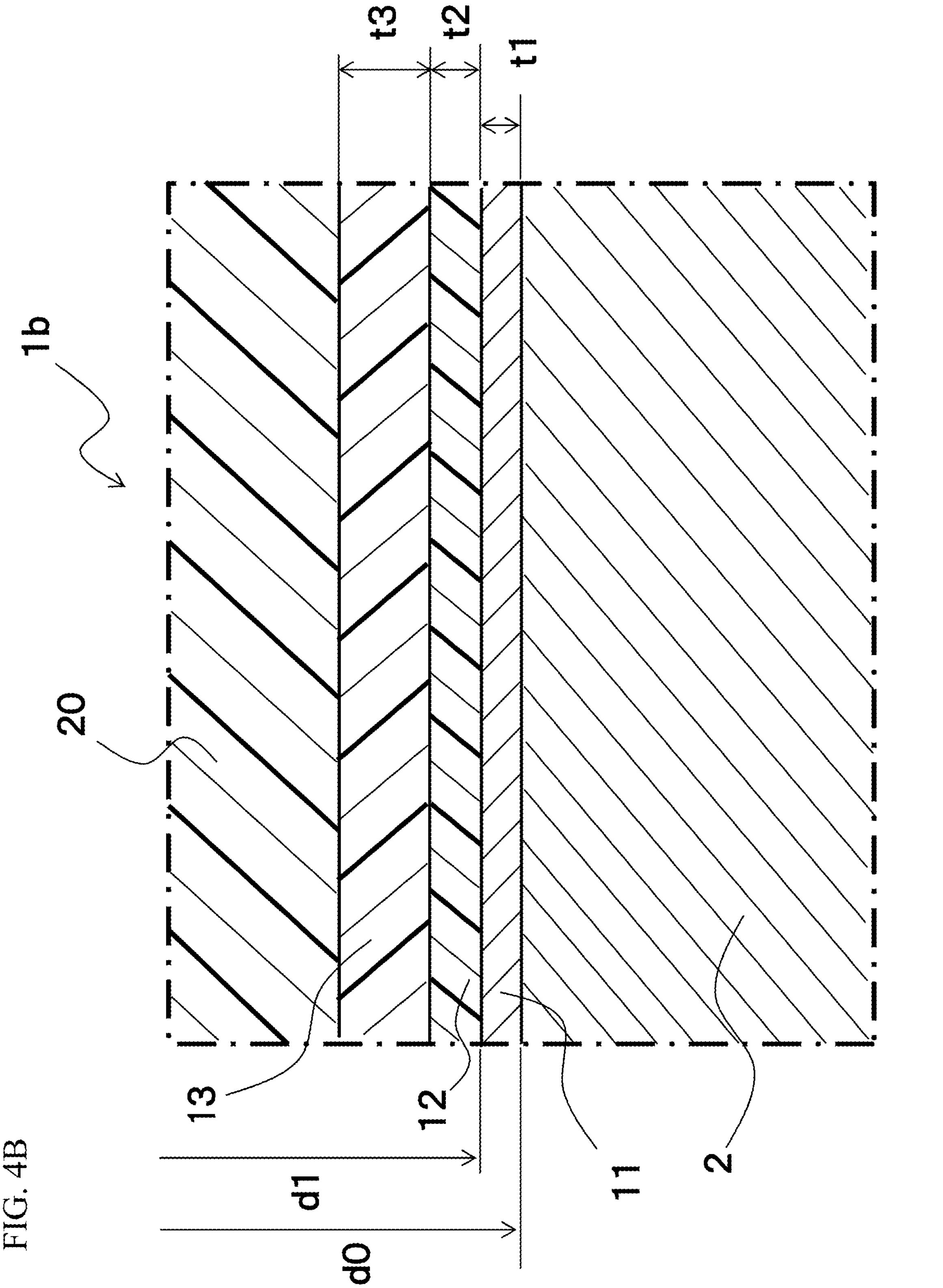
FIG. 4B is an enlarged cross section of an area IVB shown in FIG. 4A.
Figure 5C:
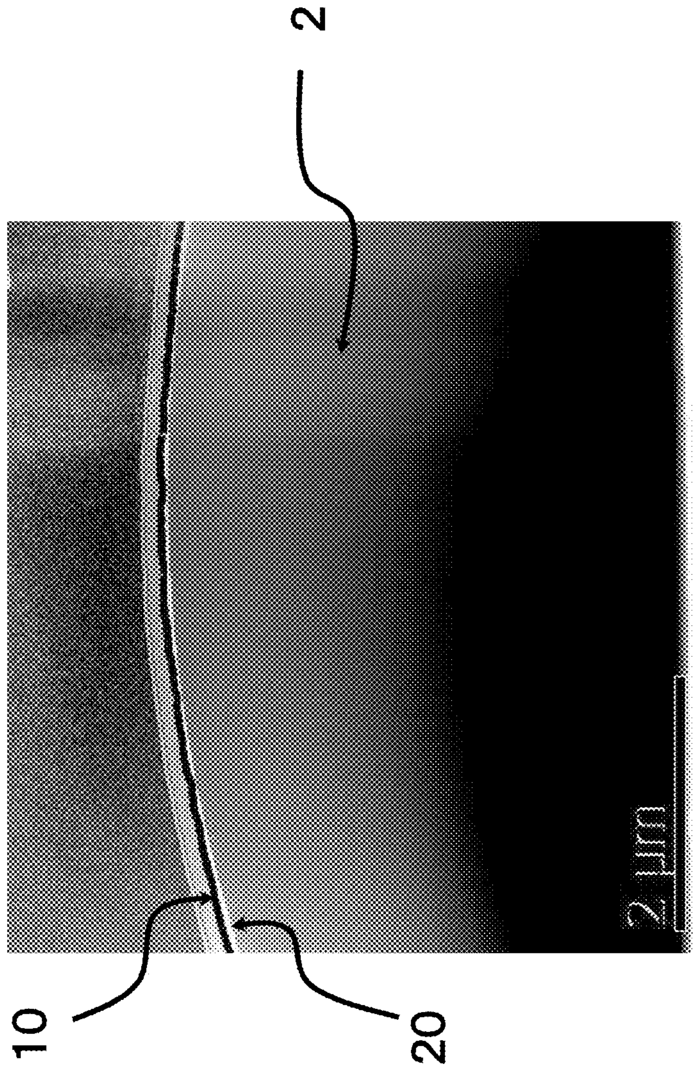
FIG. 5C is an example of a STEM image of the soft magnetic alloy 1*b* shown in FIG. 4A.

Also, as the soft magnetic alloy 1*b* shown in FIG. 4A and FIG. 4B, an insulation coating layer 20 may be formed at the outside of the Co concentrated area 11. This coating layer 20 is a coating which is formed by a surface treatment such as coating or so and it is formed after the Co concentrated area 11 is formed. An average thickness of the coating layer 20 is within a range of 5 nm or more and 100 nm or less, and more preferably it is 50 nm or less. That is, when the coating layer 20 is formed, the outermost surface 10 of the soft magnetic alloy 1*b* is constituted by the coating layer 20, and the coating layer 20 is positioned at the surface side of the soft magnetic alloy 1*b* than the Sb oxide layer 12 and the Fe oxide layer 13. In fact, FIG. 5C is one example of a STEM image of the soft magnetic alloy 1*b* shown in FIG. 4A. In said STEM image, an area having a brighter contrast can be confirmed at the outermost surface 10 of the soft magnetic alloy 1*b*, and said area is the coating layer 20.

As such, the surface structure of the soft magnetic alloy 1 can include other layers (the SB oxide layer 12, the Fe oxide layer 13, the coating layer 20, and the like) in addition to the Co concentrated area 11. Even in case of having said other layers, the Co concentrated area 11 exist at the side which is in contact with the internal area 2. Further, a perpendicular distance d1 (see FIG. 1B and FIG. 4) from the outermost surface 10 to the Co concentrated area 11 is preferably 200 nm or less, more preferably 100 nm or less, and even more preferably 50 nm or less. Particularly in case that the coating layer 20 does not exist and the outermost surface 10 is constituted by the Fe oxide layer 13 or by the SB oxide layer 12, the perpendicular distance d1 is preferably 30 nm or less, and more preferably 20 nm or less.

Note that, a measurement sample for analyzing the Co concentrated area 11 is preferably produced by using a micro-sampling method which uses FIB (Focused Ion Beam). For example, a Pt film of a thickness of 30 nm or so is formed by spattering to the outermost surface 10 of the soft magnetic alloy 1 to protect the surface while processing, then using FIB, an area having a depth of about 2 μm from the outermost surface is cut out, thereby a thin sample is obtained. Then, this thin sample is processed and thinned so that a thickness in a direction perpendicular to the depth direction is 20 nm or less. This sample formed into a thin film may be used as a measurement sample for TEM and HRTEM observation.

Hereinbelow, a method of producing the soft magnetic alloy 1 according to the present embodiment is described.

The main part (internal area 2) of the soft magnetic alloy 1 can be produced by various melting methods, and preferably it may be made by using a method in which a molten is quenched. This is because the amorphous soft magnetic alloy 1 can be easily obtained by quenching. For example, the soft magnetic alloy 1 of a ribbon form can be produced by a single roll method, and the soft magnetic alloy 1 of a powder form can be produced by an atomization method. Hereinbelow, a method of obtaining a soft magnetic alloy ribbon formed by a single roll method, and a method of obtaining a soft magnetic alloy powder formed by a gas atomization method are described.

In a single roll method, raw materials (pure metal and the like) of elements constituting the soft magnetic alloy 1 are prepared and weighed so to satisfy the target alloy composition. Then, the raw materials of the elements are melted to produce a mother alloy. A method of melting for producing the mother alloy is not particularly limited, and for example a method of melting using high frequency heating in a chamber at a predetermined degree of vacuum may be mentioned.

Next, the above-mentioned mother alloy is heated and melted to obtain a molten. A temperature of the molten may be determined by taking the melting point of the target alloy composition into consideration. For example, the temperature of the molten may be within a range of 1200° C. to 1600° C. In a single roll method, this molten is supplied using a nozzle and the like to a cooled rotating roll, thereby a soft magnetic alloy ribbon is produced along the rotating direction of the roll. A thickness of the ribbon can be regulated by adjusting a rotation speed of the roll, a distance between the nozzle and the roll, a temperature of the molten, and the like. Also, the temperature and the rotation speed of the roll may be set to a condition so that the amorphous soft magnetic alloy can be easily obtained. For example, the temperature of the roll is preferably within a range of 20° C. to 30° C., and a rotation speed is preferably within a range of 20 to 30 m/sec. Note that, an atmosphere inside the chamber is not particularly limited, and for example it can be air atmosphere or an inert gas atmosphere.

In a gas atomization method, as similar to the above-mentioned single roll method, a molten within a range of 1200° C. to 1600° C. is obtained, then the molten is sprayed in the chamber to produce a powder. Specifically, the molten is exhausted from an exhaust port towards a cooling part, and a high-pressured gas is sprayed to exhausted molten metal drops. By spraying the high-pressured gas to the molten metal drops, the molten metal drops scatter at the inside of the chamber, and as these collide against the cooling part (cooling water), the molten metal drops cool solidify and form the soft magnetic alloy powder. The particle shape of the soft magnetic alloy powder obtained by this atomization method is usually a spherical shape, and an average circularity of the soft magnetic alloy powder is preferably 0.8 or more, more preferably 0.9 or more, and even more preferably 0.95 or more.

As the high-pressured gas, an inert gas such as nitrogen gas, argon gas, helium gas, and the like; or a reducing gas such as ammonium decomposition gas and the like is preferably used. A spraying pressure of the high-pressured gas is preferably within a range of 2.0 MPa or more and 10 MPa or less. Also, a spraying amount of the exhausted molten is preferably within a range of 0.5 kg/min or more and 4.0 kg/min or less. In said gas atomization method, the particle size and the shape of the soft magnetic alloy powder can be adjusted by a ratio of the pressure of the high-pressured gas to the spraying amount of the molten.

After obtaining the soft magnetic alloy of a ribbon form or a powder form as discussed in above, this soft magnetic alloy is heat treated at a low temperature in a predetermined oxygen concentration atmosphere under a predetermined pressure, thereby the Co concentrated area 11 is formed.

Specifically, a holding temperature during the heat treatment is preferably a temperature which does not crystallize the soft magnetic alloy, and for example it is preferably within a range of 200° C. to 400° C., and more preferably within a range of 200° C. to 300° C. Also, a temperature holding time is preferably within a range of 0.5 hours to 3.0 hours. An oxygen concentration inside a heating furnace is preferably within a range of 20 ppm or more and 2000 ppm or less, and more preferably within a range of 100 ppm or more and 1000 ppm or less. Further, while controlling the oxygen concentration inside the heating furnace as mentioned in above, an inert gas such as argon gas, nitrogen gas, or the like is introduced into the heating furnace so that the inside of the heating furnace has a positive pressure. A gauge pressure inside the heating furnace is preferably within a range of 0.15 kPa or more and 0.50 kPa or less, and more preferably within a range of 0.30 kPa or more and 0.45 kPa or less. Note that, a gauge pressure refers to a pressure of which atmospheric pressure is subtracted from an absolute pressure (a pressure when an absolute vacuum is 0 Pa).

By heat treating under such condition, the Co concentrated area 11 having predetermined characteristics is formed to the surface side of the soft magnetic alloy. Also, when Si or/and B is included in the soft magnetic alloy 1, in some cases the SB oxide layer 12 may be formed due to the above-mentioned heat treatment, and depending on the conditions of the heat treatment, the Fe oxide layer 13 may be formed in some cases. Note that, when the soft magnetic alloy 1 is crystalline or nanocrystal (that is, when the amorphous degree X is less than 85%), a pre-heat treatment to control the crystallinity may be performed prior to the heat treatment for forming the above-mentioned Co concentrated area 11.

In case of forming the coating layer 20 as shown in FIG. 4A and FIG. 4B after the Co concentrated area 11 is formed due to the above-mentioned heat treatment, a coating treatment such as a phosphate coating treatment, a mechanical alloying treatment, a silane coupling treatment, a hydrothermal synthesis, and the like may be performed. As a type of coating layer 20 to be formed, phosphates, silicates, soda-lime glass, borosilicate glass, lead glass, aluminosilicate glass, borate glass, sulfate glass, and the like may be mentioned. Note that, as phophates, for example, magnesium phosphate, calcium phosphate, zinc phosphate, manganese phosphate, cadmium phosphate, and the like may be mentioned. As silicates, sodium silicate and the like may be mentioned. When the coating layer 20 is formed, improvements of the voltage resistance and the like can be expected in the magnetic core including the soft magnetic alloy 1.

The soft magnetic alloy 1 including the predetermined Co concentrated area 11 is obtained by going through the above-mentioned steps. The soft magnetic alloy 1 of the present embodiment can be applied to various magnetic components, for example, a coil component such as an inductor, a filter, an antenna, and the like may be mentioned. Particularly, the soft magnetic alloy 1 according to the present embodiment is preferably applied to a magnetic core in a coil component such as an inductor. Note that, the magnetic core including the soft magnetic alloy 1 may include a resin component, and the magnetic core may be formed by mixing the soft magnetic alloy 1 with other magnetic particles.

(Summarizing the Present Embodiment)

In the soft magnetic alloy 1 of the present embodiment, the Co concentrated area 11 satisfying predetermined characteristics is formed to the outer side of the internal area 2 having a soft magnetic type alloy composition which includes Fe and Co, and the Co concentration degree of this Co concentrated area 11 is large than 1.20. By having such characteristics, rust formation is suppressed when the soft magnetic alloy 1 is immersed in water, and the corrosion resistance can be improved.

Also, by forming the Co concentrated area 11 to the amorphous soft magnetic alloy 1 having the amorphous degree of 85% or more, the corrosion resistance of the soft magnetic alloy 1 can be further improved while ensuring a high saturation magnetic flux density Bs.

Hereinabove, the embodiment of the present disclosure is described, however, the present disclosure is not limited to the above-mentioned embodiment, and it may be variously modified within the scope of the present disclosure.

EXAMPLES

Hereinbelow, the present disclosure is described in further detail based on specific examples. Note that, the present disclosure is not limited to the examples. In tables shown in below, "*" mark indicates a sample of comparative example.

Experiment 1

In Experiment 1, a soft magnetic alloy powder was produced by using a gas atomization method. In a gas atomization method, the soft magnetic alloy powder of which a volume-based average particle size (D50) was within a range of 15 to 30 μm was obtained under the conditions of a spraying temperature of a molten: 1500° C., a spraying amount of the molten: 1.2 kg/min, a pressure of a high-pressured gas: 7.0 MPa, and a water pressure of a cooling water: 10 MPa. Then, the soft magnetic alloy powder was heat treated under the conditions shown in Table 1, and soft magnetic alloys of Sample No. 2 to 5 and 7 to 16 were obtained. Also, in Experiment 1, soft magnetic alloys of Sample No. 1 and 6 which were not heat treated were also produced. Using this Sample No. 1 and 6 as a standard, evaluations shown in below were carried out.

<Crystal Structure and Composition of the Soft Magnetic Alloy Powder>

The composition of the soft magnetic alloy powder obtained by using a gas atomization method was measured using ICP. As a result, in each of Sample No. 1 to 5 of Experiment 1, the soft magnetic alloy powder (that is the internal area 2) was confirmed to have an average composition of $Fe_{0.7}Co_{0.3}$. On the other hand, in each of Sample No. 6 to 16, the soft magnetic alloy powder (that is the internal area 2) was confirmed to have an alloy composition satisfying a compositional formula: $(Fe_{0.7}Co_{0.3})_{0.82}B_{0.11}P_{0.02}Si_{0.03}C_{0.01}Cr_{0.01}$ (atomic ratio; α=0.300, β=0, γ=0, a=0.110, b=0.020, c=0.030, d=0.010, and e=0.010).

Also, when the soft magnetic alloy powders of Experiment 1 were performed with X-ray crystallography using XRD, in each of Sample No. 1 to 5 of Experiment 1, the soft magnetic alloy powder (that is the internal area 2) was crystalline having less than 85% of the amorphous degree. On the other hand, regarding each of Sample No. 6 to 16 of Experiment 1, the soft magnetic alloy powder (that is the internal area 2) was amorphous satisfying 85% or more of the amorphous degree.

<Analysis of Surface Structure>

From the soft magnetic alloy of each sample of Experiment 1, a thin sample near the surface was taken by a micro sampling method using FIB. Further, using the thin sample, a mapping analysis was carried out using TEM-EDX to examine the Co concentrated area 11. Further, a component analysis of a specific area was carried out using TEM-EELS, and a Co concentration degree of the Co concentrated area 11 was measured. Analysis results regarding the surface structure are shown in Table 1. Note that, according to the results using EELS, the Co concentrated area 11 was confirmed to be an amorphous metal phase.

<Saturation Magnetic Flux Density Bs>

The saturation magnetic flux density Bs of each sample was measured using a vibrating sample magnetometer (VSM) under the condition of 1000 kA/m magnetic flied. Results are shown in Table 1. When this Bs was 1.50 T or more it was considered good, and 1.70 T or more was considered even better.

<Immersion Test>

First, before performing the immersion test, a magnetic core sample was produced using the soft magnetic alloy of each sample. The magnetic core sample was produced by going through below described steps. Granules were obtained by mixing 3 parts by mass of an epoxy resin to 100 parts by mass of the soft magnetic alloy. Then, the granules were filled into a mold, and then pressure molded at a pressure of 4 ton/cm$^2$, thereby a magnetic core sample of a toroidal shape having a size of an outer diameter of 11 mmφ, an inner diameter of 6.5 mmφ, and a height of 1.0 mm was obtained.

The immersion test was performed in order to evaluate the corrosion resistance of the magnetic core sample obtained in the above. For the immersion test, the magnetic core sample was immersed in tap water, then a time which took to confirm rust formation by visual observation was measured (rust formation time). In Experiment 1, the corrosion resistance of each sample was evaluated with respect to a rust formation time T1 of Sample No. 1 or Sample No. 6 which were not heat treated. Specifically, in Experiment 1, when a rust formation time of a sample was less than 1.2 times of T1 (the rust formation time of Sample No. 1 or Sample No. 6), then it was evaluated as "F (Fail)"; and when a rust formation time of a sample was 1.2 times or more than T1, it was evaluated as "G (Good)". Results of the immersion test evaluated by the above-mentioned "F and G" are shown in Table 1.

by forming the Co concentrated area 11 which satisfied the predetermined characteristics at a surface side of the soft magnetic alloy.

Note that, the specific rust formation time is not shown in Table 1, however it was confirmed that as the Co concentration degree increased, the relative corrosion resistance compared to the standard alloy tended to further improve. The Co concentration degree was preferably 1.25 or more, and more preferably 1.50 or more.

Experiment 2

In Experiment 2, the soft magnetic alloys of Sample No. 2-1 to 2-90 were obtained by changing the alloy compositions. The alloy composition of each sample was analyzed using ICP, and the results are shown in Table 2 to Table 7.

TABLE 1

| Sample No. | Soft magnetic type alloy (Internal area) Average composition | Soft magnetic type alloy (Internal area) Crystal structure | Heat treatment conditions: Holding Temp. ° C. | Heat treatment conditions: Holding time h | Heat treatment conditions: Oxygen concentration ppm | Heat treatment conditions: Gauge pressure kPa | Analysis result of surface structure Co concentrated area: Formation | Analysis result of surface structure Co concentrated area: Co concentration degree (—) | Saturation magnetic flux density Bs T | Immersion test Evaluation |
|---|---|---|---|---|---|---|---|---|---|---|
| 1※ | $Fe_{0.7}Co_{0.3}$ | Crystalline | — | — | — | — | None | — | 2.40 | Standard |
| 2※ | $Fe_{0.7}Co_{0.3}$ | Crystalline | 200 | 1.0 | 100 | 0.05 | Formed | 1.07 | 2.40 | F |
| 3 | $Fe_{0.7}Co_{0.3}$ | Crystalline | 200 | 1.0 | 100 | 0.15 | Formed | 1.25 | 2.40 | G |
| 4 | $Fe_{0.7}Co_{0.3}$ | Crystalline | 200 | 1.0 | 100 | 0.30 | Formed | 1.63 | 2.40 | G |
| 5 | $Fe_{0.7}Co_{0.3}$ | Crystalline | 200 | 1.0 | 100 | 0.45 | Formed | 1.84 | 2.39 | G |
| 6※ | $(Fe_{0.7}Co_{0.3})_{0.82}B_{0.11}P_{0.02}Si_{0.03}C_{0.01}Cr_{0.01}$ | Amorphous | — | — | — | — | None | — | 1.69 | Standard |
| 7※ | $(Fe_{0.7}Co_{0.3})_{0.82}B_{0.11}P_{0.02}Si_{0.03}C_{0.01}Cr_{0.01}$ | Amorphous | 200 | 1.0 | 20 | 0.15 | Formed | 1.10 | 1.72 | F |
| 8 | $(Fe_{0.7}Co_{0.3})_{0.82}B_{0.11}P_{0.02}Si_{0.03}C_{0.01}Cr_{0.01}$ | Amorphous | 200 | 1.0 | 20 | 0.30 | Formed | 1.26 | 1.72 | G |
| 9 | $(Fe_{0.7}Co_{0.3})_{0.82}B_{0.11}P_{0.02}Si_{0.03}C_{0.01}Cr_{0.01}$ | Amorphous | 200 | 1.0 | 20 | 0.45 | Formed | 1.46 | 1.72 | G |
| 10 | $(Fe_{0.7}Co_{0.3})_{0.82}B_{0.11}P_{0.02}Si_{0.03}C_{0.01}Cr_{0.01}$ | Amorphous | 300 | 1.0 | 20 | 0.15 | Formed | 1.45 | 1.72 | G |
| 11 | $(Fe_{0.7}Co_{0.3})_{0.82}B_{0.11}P_{0.02}Si_{0.03}C_{0.01}Cr_{0.01}$ | Amorphous | 400 | 1.0 | 20 | 0.15 | Formed | 1.56 | 1.72 | G |
| 12 | $(Fe_{0.7}Co_{0.3})_{0.82}B_{0.11}P_{0.02}Si_{0.03}C_{0.01}Cr_{0.01}$ | Amorphous | 200 | 0.5 | 100 | 0.30 | Formed | 1.77 | 1.72 | G |
| 13 | $(Fe_{0.7}Co_{0.3})_{0.82}B_{0.11}P_{0.02}Si_{0.03}C_{0.01}Cr_{0.01}$ | Amorphous | 200 | 2.0 | 100 | 0.30 | Formed | 1.99 | 1.72 | G |
| 14 | $(Fe_{0.7}Co_{0.3})_{0.82}B_{0.11}P_{0.02}Si_{0.03}C_{0.01}Cr_{0.01}$ | Amorphous | 200 | 1.0 | 100 | 0.30 | Formed | 2.01 | 1.71 | G |
| 15 | $(Fe_{0.7}Co_{0.3})_{0.82}B_{0.11}P_{0.02}Si_{0.03}C_{0.01}Cr_{0.01}$ | Amorphous | 200 | 1.0 | 500 | 0.30 | Formed | 2.44 | 1.71 | G |
| 16 | $(Fe_{0.7}Co_{0.3})_{0.82}B_{0.11}P_{0.02}Si_{0.03}C_{0.01}Cr_{0.01}$ | Amorphous | 200 | 1.0 | 1000 | 0.30 | Formed | 2.52 | 1.71 | G |

As shown in Table 1, regarding samples in which the Co concentrated area 11 was formed and the Co concentration degree was more than 1.20 (Sample No. 3 to 5, and 8 to 16), a good relative corrosion resistance was attained compared to a standard alloy (Sample No. 1 or Sample No. 6). Note that, in Sample No. 3 to 5 and 8 to 16, it was confirmed that a perpendicular distance d1 which was a distance from the outermost surface 10 to the Co concentrated area 11 was 30 nm or less. According to this result, it was proven that the corrosion resistance improved while maintaining a high Bs Specifically, for Sample No. 2-1 to 2-14 shown in Table 2, each sample satisfied a compositional formula: $(Fe_{1-\alpha}Co_{\alpha})_{0.84}B_{0.11}Si_{0.03}C_{0.01}Cr_{0.01}$ (atomic ratio; β=0, γ=0, α=0.110, b=0, c=0.030, d=0.010, and e=0.010), and a Co atomic ratio α was varied, thereby the soft magnetic alloy was produced.

Also, for the soft magnetic alloys of Sample No. 2-15 to 2-34 shown in Table 3, the atomic ratios of Co, Ni, and X1 were respectively fixed to α=0.300, β=0, and γ=0; and then the atomic ratios of metalloids (B, P, Si, and C) and Cr were varied.

Also, for Sample No. 2-35 to 2-38 shown in Table 4, each sample satisfied a compositional formula: $(Fe_{(1-(0.3+\beta))}Co_{0.3}Ni_{\beta})_{0.84}B_{0.11}Si_{0.03}C_{0.01}Cr_{0.01}$ (atomic ratios: α=0.300, γ=0, a=0.110, b=0, c=0.030, d=0.010, and e=0.010), and a Ni atomic ratio β was varied, thereby the soft magnetic alloy was produced.

Also, for Sample No. 2-39 to 2-90 shown in Table 5 to Table 7, each sample satisfied a compositional formula: $((Fe_{0.7}Co_{0.3})_{0.975}X1_{0.025})_{0.84}B_{0.11}Si_{0.03}C_{0.01}Cr_{0.01}$ (atomic ratios; α=0.300, β=0, γ=0.025, a=0.110, b=0, c=0.030, d=0.010, and e=0.010), and a type of X1 element was varied, thereby the soft magnetic alloy was produced.

Note that, all of the soft magnetic alloys of Experiment 2 had an amorphous degree X of 85% or more. Also, in Experiment 2, for each alloy composition, a sample performed with a predetermined heat treatment and a sample without the predetermined heat treatment were formed; and in Table 2 to Table 7, the sample performed with the heat treatment was shown as "Y", and the sample without the heat treatment was shown as "N". Also, conditions of the heat treatment of Experiment 2 were a holding temperature: 200° C., a holding time: 1 h, an oxygen concentration in a heating furnace: 100 ppm, and a gauge pressure in the heating furnace: 0.30 kPa.

Also, for each of Sample No. 2-1 to 2-90 of Experiment 2, as similar to Experiment 1, Bs was measured and also the immersion test was performed. In the immersion test of Experiment 2, for the same composition, the rust formation time of a sample without the heat treat was defined as $T_N$, and the rust formation time of a sample performed with the heat treatment was defined as $T_Y$, then a sample which showed $T_Y/T_N<1.2$ was evaluated as "F (Fail)", and a sample which showed $1.2 \leq T_Y/T_N$ was evaluated as "G (Good)". Evaluation results are shown in Table 2 to Table 7.

TABLE 2

| | Alloy composition: $(Fe_{(1-\alpha)}Co_{\alpha})_{(1-(a+b+c+d+e))}B_aP_bSi_cC_dCr_e$ (β = 0, γ = 0) | | | | | | Heat treated | Analysis result of surface structure Co concentrated area | | Saturation magnetic flux density | Immersion |
|---|---|---|---|---|---|---|---|---|---|---|---|
| Sample No. | Co α | B a | P b | Si c | C d | Cr e | or not Y or N | Formation | Co concentration degree (—) | Bs T | test Evaluation |
| 2-1※ | 0.05 | 0.11 | 0 | 0.03 | 0.01 | 0.01 | N | None | — | 1.68 | Standard |
| 2-2 | 0.05 | 0.11 | 0 | 0.03 | 0.01 | 0.01 | Y | Formed | 3.67 | 1.71 | G |
| 2-3※ | 0.10 | 0.11 | 0 | 0.03 | 0.01 | 0.01 | N | None | — | 1.69 | Standard |
| 2-4 | 0.10 | 0.11 | 0 | 0.03 | 0.01 | 0.01 | Y | Formed | 5.52 | 1.71 | G |
| 2-5※ | 0.15 | 0.11 | 0 | 0.03 | 0.01 | 0.01 | N | None | — | 1.69 | Standard |
| 2-6 | 0.15 | 0.11 | 0 | 0.03 | 0.01 | 0.01 | Y | Formed | 3.86 | 1.71 | G |
| 2-7※ | 0.30 | 0.11 | 0 | 0.03 | 0.01 | 0.01 | N | None | — | 1.73 | Standard |
| 2-8 | 0.30 | 0.11 | 0 | 0.03 | 0.01 | 0.01 | Y | Formed | 1.91 | 1.75 | G |
| 2-9※ | 0.50 | 0.11 | 0 | 0.03 | 0.01 | 0.01 | N | None | — | 1.63 | Standard |
| 2-10 | 0.50 | 0.11 | 0 | 0.03 | 0.01 | 0.01 | Y | Formed | 1.82 | 1.65 | G |
| 2-10※ | 0.60 | 0.11 | 0 | 0.03 | 0.01 | 0.01 | N | None | — | 1.59 | Standard |
| 2-12 | 0.60 | 0.11 | 0 | 0.03 | 0.01 | 0.01 | Y | Formed | 1.66 | 1.62 | G |
| 2-13※ | 0.70 | 0.11 | 0 | 0.03 | 0.01 | 0.01 | N | None | — | 1.53 | Standard |
| 2-14 | 0.70 | 0.11 | 0 | 0.03 | 0.01 | 0.01 | Y | Formed | 1.60 | 1. 55 | G |

TABLE 3

| | Alloy composition: $(Fe_{(1-\alpha)}Co_{\alpha})_{(1-(a+b+c+d+e))}B_aP_bSi_cC_dCr_e$ (β = 0, γ = 0) | | | | | | Heat treated | Analysis result of surface structure Co concentrated area | | Saturation magnetic flux density | Immersion |
|---|---|---|---|---|---|---|---|---|---|---|---|
| Sample No. | Co α | B a | P b | Si c | C d | Cr e | or not Y or N | Formation | Co concentration degree (—) | Bs T | test Evaluation |
| 2-15※ | 0.300 | 0.020 | 0.040 | 0.030 | 0.010 | 0.010 | N | None | — | 1.78 | Standard |
| 2-16 | 0.300 | 0.020 | 0.040 | 0.030 | 0.010 | 0.010 | Y | Formed | 2.15 | 1.80 | G |
| 2-17※ | 0.300 | 0.200 | 0.000 | 0.000 | 0.000 | 0.010 | N | None | — | 1.52 | Standard |
| 2-18 | 0.300 | 0.200 | 0.000 | 0.000 | 0.000 | 0.010 | Y | Formed | 2.31 | 1.55 | G |
| 2-19※ | 0.300 | 0.110 | 0.030 | 0.030 | 0.010 | 0.010 | N | None | — | 1.67 | Standard |
| 2-20 | 0.300 | 0.110 | 0.030 | 0.030 | 0.010 | 0.010 | Y | Formed | 2.32 | 1.70 | G |
| 2-21※ | 0.300 | 0.110 | 0.070 | 0.030 | 0.010 | 0.010 | N | None | — | 1.53 | Standard |
| 2-22 | 0.300 | 0.110 | 0.070 | 0.030 | 0.010 | 0.010 | Y | Formed | 2.42 | 1.55 | G |
| 2-23※ | 0.300 | 0.140 | 0.020 | 0.000 | 0.010 | 0.010 | N | None | — | 1.72 | Standard |
| 2-24 | 0.300 | 0.140 | 0.020 | 0.000 | 0.010 | 0.010 | Y | Formed | 2.25 | 1.74 | G |
| 2-25※ | 0.300 | 0.110 | 0.000 | 0.100 | 0.010 | 0.010 | N | None | — | 1.55 | Standard |
| 2-26 | 0.300 | 0.110 | 0.000 | 0.100 | 0.010 | 0.010 | Y | Formed | 2.44 | 1.58 | G |
| 2-27※ | 0.300 | 0.110 | 0.000 | 0.030 | 0.000 | 0.010 | N | None | — | 1.73 | Standard |
| 2-28 | 0.300 | 0.110 | 0.000 | 0.030 | 0.000 | 0.010 | Y | Formed | 2.18 | 1.74 | G |
| 2-29※ | 0.300 | 0.110 | 0.000 | 0.030 | 0.050 | 0.010 | N | None | — | 1.53 | Standard |
| 2-30 | 0.300 | 0.110 | 0.000 | 0.030 | 0.050 | 0.010 | Y | Formed | 2.47 | 1.55 | G |

TABLE 3-continued

| Sample No. | Alloy composition: $(Fe_{(1-\alpha)}Co_{\alpha})_{(1-(a+b+c+d+e))}B_aP_bSi_cC_dCr_e$ ($\beta$ = 0, $\gamma$ = 0) Co α | B a | P b | Si c | C d | Cr e | Heat treated or not Y or N | Analysis result of surface structure Co concentrated area Formation | Co concentration degree (—) | Saturation magnetic flux density Bs T | Immersion test Evaluation |
|---|---|---|---|---|---|---|---|---|---|---|---|
| 2-31※ | 0.300 | 0.110 | 0.000 | 0.030 | 0.010 | 0.000 | N | None | — | 1.79 | Standard |
| 2-32 | 0.300 | 0.110 | 0.000 | 0.030 | 0.010 | 0.000 | Y | Formed | 2.23 | 1.81 | G |
| 2-33※ | 0.300 | 0.110 | 0.000 | 0.030 | 0.010 | 0.040 | N | None | — | 1.66 | Standard |
| 2-34 | 0.300 | 0.110 | 0.000 | 0.030 | 0.010 | 0.040 | Y | Formed | 2.31 | 1.67 | |

TABLE 4

| Sample No. | Alloy composition: $(Fe_{(1-(\alpha+\beta))}Co_{\alpha}Ni_{\beta})_{0.840}B_{0.11}Si_{0.03}C_{0.01}Cr_{0.01}$ ($\gamma$ = 0, b = 0) Co α | Ni β | Heat treated or not Y or N | Analysis result of surface structure Co concentrated area Formation | Co concentration degree (—) | Saturation magnetic flux density Bs T | Immersion test Evaluation |
|---|---|---|---|---|---|---|---|
| 2-35 | 0.300 | 0.005 | N | None | — | 1.74 | Standard |
| 2-36 | 0.300 | 0.005 | Y | Formed | 2.03 | 1.75 | G |
| 2-37※ | 0.300 | 0.200 | N | None | — | 1.56 | Standard |
| 2-38 | 0.300 | 0.200 | Y | Formed | 1.34 | 1.58 | G |

TABLE 5

| Sample No. | Alloy composition: $((Fe_{(1-\alpha)}Co_{\alpha})_{1-\gamma}X1_{\gamma})_{0.840}B_{0.11}Si_{0.03}C_{0.01}Cr_{0.01}$ ($\beta$ = 0, b = 0) Co α | X1 Element type | X1 γ | Heat treated or not Y or N | Analysis result of surface structure Co concentrated area Formation | Co concentration degree (—) | Saturation magnetic flux density Bs T | Immersion test Evaluation |
|---|---|---|---|---|---|---|---|---|
| 2-39※ | 0.300 | Al | 0.025 | N | None | — | 1.70 | Standard |
| 2-40 | 0.300 | Al | 0.025 | Y | Formed | 2.29 | 1.72 | G |
| 2-41※ | 0.300 | Zn | 0.025 | N | None | — | 1.70 | Standard |
| 2-42 | 0.300 | Zn | 0.025 | Y | Formed | 2.24 | 1.72 | G |
| 2-43※ | 0.300 | Sn | 0.025 | N | None | — | 1.69 | Standard |
| 2-44 | 0.300 | Sn | 0.025 | Y | Formed | 2.25 | 1.71 | G |
| 2-45※ | 0.300 | Cu | 0.025 | N | None | — | 1.68 | Standard |
| 2-46 | 0.300 | Cu | 0.025 | Y | Formed | 2.28 | 1.70 | G |
| 2-47※ | 0.300 | Bi | 0.025 | N | None | — | 1.69 | Standard |
| 2-48 | 0.300 | Bi | 0.025 | Y | Formed | 2.32 | 1.71 | G |
| 2-49※ | 0.300 | La | 0.025 | N | None | — | 1.59 | Standard |
| 2-50 | 0.300 | La | 0.025 | Y | Formed | 2.22 | 1.61 | G |

TABLE 5-continued

| Sample No. | Alloy composition: $((Fe_{(1-\alpha)}Co_{\alpha})_{1-\gamma}X1_{\gamma})_{0.840}B_{0.11}Si_{0.03}C_{0.01}Cr_{0.01}$ ($\beta$ = 0, b = 0) Co $\alpha$ | X1 Element type | X1 $\gamma$ | Heat treated or not Y or N | Analysis result of surface structure Co concentrated area Formation | Co concentration degree (—) | Saturation magnetic flux density Bs T | Immersion test Evaluation |
|---|---|---|---|---|---|---|---|---|
| 2-51※ | 0.300 | Y | 0.025 | N | None | — | 1.64 | Standard |
| 2-52 | 0.300 | Y | 0.025 | Y | Formed | 2.25 | 1.66 | G |
| 2-53※ | 0.300 | Ga | 0.025 | N | None | — | 1.64 | Standard |
| 2-54 | 0.300 | Ga | 0.025 | Y | Formed | 2.28 | 1.66 | G |
| 2-55※ | 0.300 | Ti | 0 025 | N | None | — | 1.59 | Standard |
| 2-56 | 0.300 | Ti | 0.025 | Y | Formed | 2.31 | 1.61 | G |
| 2-57※ | 0.300 | Zr | 0.025 | N | None | — | 1.60 | Standard |
| 2-58 | 0.300 | Zr | 0.025 | Y | Formed | 2.29 | 1.62 | G |
| 2-59※ | 0.300 | Hf | 0 025 | N | None | — | 1.59 | Standard |
| 2-60 | 0.300 | Hf | 0.025 | Y | Formed | 2.24 | 1.61 | G |
| 2-61※ | 0.300 | Nb | 0.025 | N | None | — | 1.59 | Standard |
| 2-62 | 0.300 | Nb | 0.025 | Y | Formed | 2.26 | 1.61 | G |

TABLE 6

| Sample No. | Alloy composition: $((Fe_{(1-\alpha)}Co_{\alpha})_{1-\gamma}X1_{\gamma})_{0.840}B_{0.11}Si_{0.03}C_{0.01}Cr_{0.01}$ ($\beta$ = 0, b = 0) Co $\alpha$ | X1 Element type | X1 $\gamma$ | Heat treated or not Y or N | Analysis result of surface structure Co concentrated area Formation | Co concentration degree (—) | Saturation magnetic flux density Bs T | Immersion test Evaluation |
|---|---|---|---|---|---|---|---|---|
| 2-63※ | 0.300 | Ta | 0.025 | N | None | — | 1.59 | Standard |
| 2-64 | 0.300 | Ta | 0.025 | Y | Formed | 2.22 | 1.61 | G |
| 2-65※ | 0.300 | Mo | 0.025 | N | None | — | 1.59 | Standard |
| 2-66 | 0.300 | Mo | 0.025 | Y | Formed | 2.22 | 1.61 | G |
| 2-67※ | 0.300 | V | 0.025 | N | None | — | 1.59 | Standard |
| 2-68 | 0.300 | V | 0.025 | Y | Formed | 2.31 | 1.61 | G |
| 2-69※ | 0.300 | W | 0.025 | N | None | — | 1.59 | Standard |
| 2-70 | 0.300 | W | 0.025 | Y | Formed | 2.30 | 1.61 | G |
| 2-71※ | 0.300 | Ca | 0.025 | N | None | — | 1.67 | Standard |
| 2-72 | 0.300 | Ca | 0.025 | Y | Formed | 2.22 | 1.69 | G |
| 2-73※ | 0.300 | Mg | 0.025 | N | None | — | 1.66 | Standard |
| 2-74 | 0.300 | Mg | 0.025 | Y | Formed | 2.32 | 1.68 | G |
| 2-75※ | 0.300 | S | 0.025 | N | None | — | 1.68 | Standard |
| 2-76 | 0.300 | S | 0.025 | Y | Formed | 2.24 | 1.70 | G |
| 2-77※ | 0.300 | N | 0.025 | N | None | — | 1.68 | Standard |
| 2-78 | 0.300 | N | 0.025 | Y | Formed | 2.27 | 1.70 | G |
| 2-79※ | 0.300 | 0 | 0.025 | N | None | — | 1.68 | Standard |
| 2-80 | 0.300 | 0 | 0.025 | Y | Formed | 2.12 | 1.70 | G |

TABLE 7

| Sample No. | Alloy composition: $((Fe_{(1-\alpha)}Co_{\alpha})_{1-\gamma}X1_{\gamma})_{0.840}B_{0.11}Si_{0.03}C_{0.01}Cr_{0.01}$ ($\beta$ = 0, b = 0) Co $\alpha$ | X1 Element type | X1 $\gamma$ | Heat treated or not Y or N | Analysis result of surface structure Co concentrated area Formation | Co concentration degree (—) | Saturation magnetic flux density Bs T | Immersion test Evaluation |
|---|---|---|---|---|---|---|---|---|
| 2-81※ | 0.300 | Ag | 0.025 | N | None | — | 1.62 | Standard |
| 2-82 | 0.300 | Ag | 0.025 | Y | Formed | 2.29 | 1.64 | G |
| 2-83※ | 0.300 | As | 0.025 | N | None | — | 1.61 | Standard |
| 2-84 | 0.300 | As | 0.025 | Y | Formed | 2.32 | 1.63 | G |

TABLE 7-continued

| Sample No. | Alloy composition: $((Fe_{(1-\alpha)}Co_{\alpha})_{1-\gamma}X1_{\gamma})_{0.840}B_{0.11}Si_{0.03}C_{0.01}Cr_{0.01}$ (β = 0, b = 0) Co α | X1 Element type | γ | Heat treated or not Y or N | Analysis result of surface structure Co concentrated area Formation | Co concentration degree (—) | Saturation magnetic flux density Bs T | Immersion test Evaluation |
|---|---|---|---|---|---|---|---|---|
| 2-85※ | 0.300 | Sb | 0.025 | N | None | — | 1.60 | Standard |
| 2-86 | 0.300 | Sb | 0.025 | Y | Formed | 2.27 | 1.62 | G |
| 2-87※ | 0.300 | Au | 0.025 | N | None | — | 1.62 | Standard |
| 2-88 | 0.300 | Au | 0.025 | Y | Formed | 2.25 | 1.64 | G |
| 2-89※ | 0.300 | Pt | 0.025 | N | None | — | 1.60 | Standard |
| 2-90 | 0.300 | Pt | 0.025 | Y | Formed | 2.26 | 1.62 | G |

As shown in Table 2 to Table 7, in the sample which was performed with the predetermined heat treatment exhibited a higher corrosion resistance than the sample without the heat treatment. Thus, from this result, it can be understood that within the alloy composition range shown in Experiment 2, by forming the Co concentrated area 11 having predetermined characteristics, the corrosion resistance was improved while maintaining a high Bs.

Note that, according to the results shown in Table 2, as the Co amount increased in the internal area 2 (that is, as the Co amount of the soft magnetic alloy increased), it took longer time till the rust was formed. That is, as the Co amount in the internal area 2 increased, the corrosion resistance, which is an absolute evaluation, improved. Note that, as Sample No. 2-14 of Table 2 shows, when the Co amount in the internal area 2 was high, the Co concentration degree rather tended to decrease. Also, compared to Sample No. 2-14, a relative improvement effect of the corrosion resistance (that is, the corrosion resistance compared to the standard alloy) was better in Sample No. 2-2, 2-4, 2-6, 2-8, 2-10, and 2-12 which had high Co concentration degree. That is, according to this result, as the Co concentration degree increased, the improvement effect of the corrosion resistance with respect to the standard alloy (the sample without the heat treatment which was the treatment for forming the concentrated area) was further enhanced.

Experiment 3

In Experiment 3, an amorphous soft magnetic alloy powder having the amorphous degree X of 85% or more (Sample No. 3-1 and 3-2), and a nanocrystal soft magnetic alloy powder having the amorphous degree X of less than 85% (Sample No. 3-3 and 3-4), and a crystalline soft magnetic alloy powder having the amorphous degree X of less than 85% (Sample No. 3-5 and 3-6) were produced. Then, the influence to the corrosion resistance due to the difference in the crystal structures of the soft magnetic alloys was examined.

In Experiment 3, the crystal structure of each sample was regulated by a pre-heat treatment. Specifically, in Sample No. 3-1 and 3-2 of Experiment 3, an amorphous soft magnetic alloy powder was obtained since the per-heat treatment was not performed. Note that, Sample No. 3-1 and 3-2 corresponds to Sample No. 6 and 14 of Experiment 1. Also, in Sample No. 3-3 and 3-4 of Experiment 3, by performing the pre-heat treatment at a holding temperature: 500° C., a nanocrystal soft magnetic alloy powder was obtained. Also, in Sample No. 3-5 and 3-6 of Experiment 3, by performing the pre-heat treatment at a holding temperature: 650° C., a crystalline soft magnetic alloy powder was obtained. Note that, other conditions of the above-mentioned pre-heat treatment were, a temperature increasing rate: 100° C./min, a furnace atmosphere: Ar atmosphere, and a gauge pressure inside the heating furnace: 0.0 kPa, thereby the crystal structure was controlled in a state which did not form the Co concentrated area 11.

The composition of the soft magnetic alloy of each sample of Experiment 3 was $(Fe_{0.7}Co_{0.3})_{0.82}B_{0.11}P_{0.02}Si_{0.03}C_{0.01}Cr_{0.01}$. Also, in Experiment 3, for each crystal structure, a sample carried out with the heat treatment for forming the Co concentrated area 11, and a sample without the heat treatment were produced. In Table 8, the sample performed with the heat treatment was shown as "Y", and the sample without the heat treatment was shown as "N". Note that, for samples which were performed with the pre-heat treatment (Sample No. 3-4 and 3-5), the heat treatment for forming the Co concentrated area 11 was performed after the pre-heat treatment. Conditions of the heat treatment of Experiment 3 were a holding temperature: 200° C., a holding time: 1.0 h, an oxygen concentration in a heating furnace: 100 ppm, and a gauge pressure in the heating furnace: 0.3 kPa.

Also, in Experiment 3 as similar to Experiment 2, Bs was measured and the immersion test was performed. Regarding the immersion test of Experiment 3, for the same crystal structure, the rust formation time of a sample without the heat treat was defined as $T_N$, and the rust formation time of a sample performed with the heat treatment was defined as $T_Y$, then a sample which showed $T_Y/T_N<1.2$ was evaluated as "F (Fail)", and a sample which showed $1.2 \leq T_Y/T_N$ was evaluated "G (Good)". Evaluation results are shown in Table 8.

TABLE 8

| Sample No. | Alloy composition: $(Fe_{(1-\alpha)}Co_{\alpha})_{(1-(a+b+c+d+e))}B_aP_bSi_cC_dCr_e$ (β = 0, γ = 0) Co α | B a | P b | Si c | C d | Cr e | Crystal structure of alloy powder (before low temp. oxdation treatment) (—) | Heat treated or not Y or N | Analysis result of surace structure Co concentrated area Formation | Co concentration degree (—) | Saturation magnetic flux density Bs T | Immersion test Evaluation |
|---|---|---|---|---|---|---|---|---|---|---|---|---|
| 3-1※ | 0.30 | 0.11 | 0.02 | 0.03 | 0.01 | 0.01 | Amorphous | N | None | — | 1.69 | Standard |
| 3-2 | 0.30 | 0.11 | 0.02 | 0.03 | 0.01 | 0.01 | Amorphous | Y | Formed | 2.01 | 1.71 | G |
| 3-3※ | 0.30 | 0.11 | 0.02 | 0.03 | 0.01 | 0.01 | Nanocrystal | N | None | — | 1.72 | Standard |
| 3-4 | 0.30 | 0.11 | 0.02 | 0.03 | 0.01 | 0.01 | Nanocrystal | Y | Formed | 1.97 | 1.72 | G |
| 3-5※ | 0.30 | 0.11 | 0.02 | 0.03 | 0.01 | 0.01 | Crystalline | N | None | — | 1.78 | Standard |
| 3-6 | 0.30 | 0.11 | 0.02 | 0.03 | 0.01 | 0.01 | Crystalline | Y | Formed | 1.79 | 1.79 | G |

Table 8 shows that, similar to the amorphous soft magnetic alloy, in the nanocrystal or crystalline soft magnetic alloy, Sample No. 3-4 and 3-6 which were formed with the Co concentrated area 11*b* by performing the predetermined heat treatment showed improved corrosion resistance compared to Sample No. 3-3 and 3-5 which were not heat treated. Also, by comparing the results of Sample No. 3-3 to 3-5 shown in Table 8 with the results of Sample No. 3-1 and 3-2, it can be understood that when the soft magnetic alloy was amorphous, the rust formation time was longer than that of the standard alloy, and the improvement effect of the relative corrosion resistance was particularly good.

Experiment 4

In Experiment 4, the ribbon form soft magnetic alloy samples (Sample No. 4-1 and 4-2) were produced by using a single roll method. Conditions for forming ribbons were, a temperature of a molten sprayed to a roll: 1300° C., a roll temperature: 30° C., and a roll rotation speed: 25 m/sec. The inside of the chamber was air atmosphere. The soft magnetic alloy ribbon obtained under the above-mentioned conditions had a thickness of 20 to 25 μm, a width of a short direction of about 5 mm, and a length of ribbon of about 10 m.

Also, in Experiment 4, as similar to Experiment 1, the alloy compositions of Sample No. 4-1 and 4-2 were measured using ICP, and it was confirmed that both samples satisfied the compositional formula: $(Fe_{0.7}Co_{0.3})_{0.82}B_{0.11}P_{0.02}Si_{0.03}C_{0.01}Cr_{0.01}$ (atomic ratios; α=0.300, β=0, γ=0, a=0.110, b=0.020, c=0.030, d=0.010, and e=0.010). Further, when the crystal structure of the soft magnetic alloy ribbons of Sample No. 4-1 and 4-2 were measured using XRD, the amorphous crystal structure having the amorphous degree X: 85% or higher was confirmed in both of Sample No. 4-1 and 4-2.

For the soft magnetic alloy ribbon of Sample No. 4-1, the heat treatment was not performed, and an analysis of the surface structure, Bs measurement, and the immersion test were performed. On the other hand, the soft magnetic alloy ribbon of Sample No. 4-2 was performed with a heat treatment under the conditions shown in Table 9, and the same evaluations as Sample No. 4-1 were carried out. Note that, in the immersion test of the soft magnetic alloy ribbon, the ribbon was cut into an arbitrary size (a length of about 4 cm×a width of about 5 mm) to prepare a sample for immersion test. Then, the sample of a ribbon form for immersion test was immersed in tab water. Results of the immersion test of Experiment 4 were evaluated as same as Experiment 1. The evaluation results of each sample of Experiment 4 are shown in Table 9. Note that, Table 9 includes the experiment results of the soft magnetic alloy powders (Sample No. 6 and 14 of Experiment 1) having the same alloy composition as Sample No. 4-1 and 4-2.

TABLE 9

| Sample No. | Shape of soft magnetic alloy | Heat treatment condition Holding Temp. ° C. | Holding time h | Oxygen concentration ppm | Gauge pressure kPa | Analysis result of surface structure Co concentrated area Formation | Co concentration degree (—) | Saturation magnetic flux density Bs T | Immersion test Evaluation |
|---|---|---|---|---|---|---|---|---|---|
| 6※ | Powder | — | — | — | — | None | — | 1.69 | Standard |
| 14 | Powder | 200 | 1.0 | 100 | 0.30 | Formed | 2.01 | 1.71 | G |
| 4-1※ | Ribbon | — | — | — | — | None | — | 1.69 | Standard |
| 4-2 | Ribbon | 200 | 1.0 | 100 | 0.30 | Formed | 2.09 | 1.72 | G |

As shown in Table 9, when the soft magnetic alloy was a ribbon form, by forming the Co concentrated area 11*b* by performing the predetermined heat treatment, the corrosion resistance can be improved while maintaining a high Bs.

NUMERICAL REFERENCES

1, 1*a*, 1*b* . . . Soft magnetic alloy
2 . . . Internal area
10 . . . Outermost surface
11 . . . Co concentrated area
12 . . . SB oxide layer
13 . . . Fe oxide layer
20 . . . Coating layer

What is claimed is:

1. A soft magnetic alloy comprising
an internal area having a soft magnetic alloy composition including Fe and Co, and
a Co concentrated area existing closer to a surface side than the internal area and having a higher Co concentration than in the internal area, wherein
a ratio of a Co concentration in the Co concentrated area to a Co concentration in the internal area is 1.25 or more, in which each of the Co concentration in the Co concentrated area and the Co concentration in the internal area is a mole ratio of Co with respect to a sum of Fe and Co, and
the internal area is an area at a depth of 0.2 μm or more from an outermost surface of the soft magnetic alloy towards an inside.

2. The soft magnetic alloy according to claim 1, wherein the Co concentrated area comprises a metal phase.

3. The soft magnetic alloy according to claim 1 having an amorphous degree of 85% or more.

4. The soft magnetic alloy according to claim 1 being a ribbon form.

5. The soft magnetic alloy according to claim 1 being a powder form.

6. A magnetic component including a soft magnetic alloy according to claim 1.

* * * * *